(12) United States Patent
Miller et al.

(10) Patent No.: US 7,564,870 B2
(45) Date of Patent: Jul. 21, 2009

(54) METHODS AND SYSTEMS FOR PROVIDING DATABASE NODE ACCESS CONTROL FUNCTIONALITY IN A COMMUNICATIONS NETWORK ROUTING NODE

(75) Inventors: Paul A. Miller, Raleigh, NC (US); Robby D. Benedyk, Angier, NC (US); Venkataramaiah Ravishankar, Cary, NC (US); Peter J. Marsico, Chapel Hill, NC (US); Dean D. Glenn, Cary, NC (US)

(73) Assignee: Tekelec, Morrisville, NC (US)

( * ) Notice: Subject to any disclaimer, the term of this patent is extended or adjusted under 35 U.S.C. 154(b) by 141 days.

(21) Appl. No.: 11/224,705

(22) Filed: Sep. 12, 2005
(Under 37 CFR 1.47)

(65) Prior Publication Data
US 2006/0034329 A1  Feb. 16, 2006

Related U.S. Application Data

(63) Continuation of application No. 09/537,835, filed on Mar. 29, 2000, now Pat. No. 6,944,184, and a continuation-in-part of application No. 09/443,712, filed on Nov. 19, 1999, now Pat. No. 7,050,456, which is a continuation-in-part of application No. 09/205,809, filed on Dec. 4, 1998, now Pat. No. 6,324,183.

(60) Provisional application No. 60/127,889, filed on Apr. 5, 1999.

(51) Int. Cl.
*H04J 3/16* (2006.01)

(52) U.S. Cl. .................. 370/467; 370/466; 370/352; 379/90.01

(58) Field of Classification Search .............. None
See application file for complete search history.

(56) References Cited

U.S. PATENT DOCUMENTS

| 4,558,180 | A | 12/1985 | Scordo |
| 5,008,929 | A | 4/1991 | Olsen et al. |
| 5,142,622 | A | 8/1992 | Owens |
| 5,173,897 | A | 12/1992 | Schrodi et al. |
| 5,208,811 | A | 5/1993 | Kashio et al. |

(Continued)

FOREIGN PATENT DOCUMENTS

CA    2239764    12/1998

(Continued)

OTHER PUBLICATIONS

Official Action of the European Patent Office for EP Application No. 00919979.5-2413 (Dec. 16, 2004).

(Continued)

*Primary Examiner*—Michael J Moore, Jr.
(74) *Attorney, Agent, or Firm*—Jenkins, Wilson, Taylor & Hunt, P.A.

(57) ABSTRACT

A network element provides service control point or database node front end processing functionality, as well as routing functionality for routing data packets through a network. The network element includes a first communication module for receiving data packets from a first communication network. A second communication module transmits data packets over a second communications network. A database access control (DAC) process queries a DAC database and modifies received packets to include information returned by the database lookup.

3 Claims, 11 Drawing Sheets

U.S. PATENT DOCUMENTS

| | | |
|---|---|---|
| 5,239,542 A | 8/1993 | Breidenstein et al. |
| 5,315,641 A | 5/1994 | Montgomery et al. |
| 5,384,840 A | 1/1995 | Blatchford et al. |
| 5,420,916 A | 5/1995 | Sekiguchi |
| 5,430,727 A | 7/1995 | Callon |
| 5,477,531 A | 12/1995 | McKee et al. |
| 5,509,010 A | 4/1996 | La Porta et al. |
| 5,568,487 A | 10/1996 | Sitbon et al. |
| 5,581,558 A | 12/1996 | Horney, II et al. |
| 5,583,926 A | 12/1996 | Venier et al. |
| 5,583,927 A | 12/1996 | Fly et al. |
| 5,586,177 A | 12/1996 | Farris et al. |
| 5,592,530 A | 1/1997 | Brockman et al. |
| 5,610,910 A | 3/1997 | Focsaneanu et al. |
| 5,612,949 A | 3/1997 | Bennett |
| 5,638,431 A | 6/1997 | Everett et al. |
| 5,640,446 A | 6/1997 | Everett et al. |
| 5,650,998 A | 7/1997 | Angenot et al. |
| 5,651,002 A | 7/1997 | Van Seters et al. |
| 5,657,452 A | 8/1997 | Kralowetz et al. |
| 5,661,790 A | 8/1997 | Hsu |
| 5,664,102 A | 9/1997 | Faynberg |
| 5,675,635 A | 10/1997 | Vos et al. |
| 5,680,437 A | 10/1997 | Segal |
| 5,680,552 A | 10/1997 | Netravali et al. |
| 5,694,463 A | 12/1997 | Christie et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,754,752 A | 5/1998 | Sheh et al. |
| 5,761,281 A | 6/1998 | Baum et al. |
| 5,761,290 A | 6/1998 | Farris et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,425 A | 8/1998 | Balakrishnan |
| 5,793,771 A | 8/1998 | Darland et al. |
| 5,802,285 A | 9/1998 | Hirviniemi |
| 5,805,587 A | 9/1998 | Norris et al. |
| 5,809,028 A | 9/1998 | Nethercott et al. |
| 5,812,639 A | 9/1998 | Bartholomew et al. |
| 5,812,669 A | 9/1998 | Jenkins et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,898,667 A | 4/1999 | Longfield et al. |
| 5,905,724 A | 5/1999 | Carson et al. |
| 5,912,887 A | 6/1999 | Sehgal |
| 5,917,900 A | 6/1999 | Allison et al. |
| 5,920,562 A | 7/1999 | Christie, deceased et al. |
| 5,923,659 A | 7/1999 | Curry et al. |
| 5,926,482 A | 7/1999 | Christie et al. |
| 5,933,490 A | 8/1999 | White et al. |
| 5,940,598 A | 8/1999 | Strauss et al. |
| 5,949,871 A | 9/1999 | Kabay et al. |
| 5,958,016 A | 9/1999 | Chang et al. |
| 5,966,431 A | 10/1999 | Reiman et al. |
| 5,971,900 A | 10/1999 | Miller |
| 5,974,052 A | 10/1999 | Johnson et al. |
| 5,991,301 A | 11/1999 | Christie |
| 5,995,608 A | 11/1999 | Detampel, Jr. et al. |
| 6,002,754 A | 12/1999 | Jaiswal et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,028,921 A | 2/2000 | Malik et al. |
| 6,035,020 A | 3/2000 | Weinstein et al. |
| 6,047,005 A | 4/2000 | Sherman et al. |
| 6,055,202 A | 4/2000 | Merritt |
| 6,055,302 A | 4/2000 | Schmersel et al. |
| 6,061,364 A | 5/2000 | Hager et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,081,589 A | 6/2000 | Jiang et al. |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,036 A | 8/2000 | Teshima et al. |
| 6,097,719 A | 8/2000 | Benash et al. |
| 6,097,805 A | 8/2000 | Figurski et al. |
| 6,111,780 A | 8/2000 | Bertin |
| 6,111,870 A | 8/2000 | Kurtz |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,263 A | 9/2000 | Dahlin et al. |
| 6,122,363 A * | 9/2000 | Friedlander et al. ......... 379/230 |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,138,110 A | 10/2000 | Jahn et al. |
| 6,144,667 A | 11/2000 | Doshi et al. |
| 6,144,670 A | 11/2000 | Sponaugle et al. |
| 6,147,999 A | 11/2000 | Honda et al. |
| 6,151,390 A | 11/2000 | Volftsun et al. |
| 6,154,445 A | 11/2000 | Farris et al. |
| 6,154,467 A | 11/2000 | Hager et al. |
| 6,157,710 A | 12/2000 | Figurski et al. |
| 6,167,025 A | 12/2000 | Hsing et al. |
| 6,178,181 B1 | 1/2001 | Glitho |
| 6,189,031 B1 | 2/2001 | Badger et al. |
| 6,192,051 B1 | 2/2001 | Lipman et al. |
| 6,195,425 B1 | 2/2001 | Farris |
| 6,201,804 B1 | 3/2001 | Kikinis |
| 6,208,642 B1 | 3/2001 | Balachandran et al. |
| 6,215,783 B1 | 4/2001 | Neyman |
| 6,236,722 B1 | 5/2001 | Gilbert et al. |

| | | |
|---|---|---|
| 6,240,067 B1 | 5/2001 | Sorber |
| 6,278,697 B1 | 8/2001 | Brody et al. |
| 6,285,754 B1 | 9/2001 | Sun et al. |
| 6,292,479 B1 | 9/2001 | Bartholomew et al. |
| 6,307,926 B1 | 10/2001 | Barton et al. |
| 6,311,186 B1 | 10/2001 | MeLampy et al. |
| 6,324,173 B1 | 11/2001 | Deschaine et al. |
| 6,324,183 B1 | 11/2001 | Miller et al. |
| 6,327,258 B1 | 12/2001 | Deschaine et al. |
| 6,327,267 B1 | 12/2001 | Valentine et al. |
| 6,327,350 B1 | 12/2001 | Spangler et al. |
| 6,330,250 B1 | 12/2001 | Curry et al. |
| 6,330,614 B1 | 12/2001 | Aggarwal et al. |
| 6,333,931 B1 | 12/2001 | LaPier et al. |
| 6,335,937 B1 | 1/2002 | Chao et al. |
| 6,349,099 B1 | 2/2002 | Larikka et al. |
| 6,366,655 B1 | 4/2002 | Book et al. |
| 6,377,799 B1 | 4/2002 | Hameleers et al. |
| 6,385,301 B1 | 5/2002 | Nolting et al. |
| 6,393,022 B1 | 5/2002 | Hewett et al. |
| 6,393,581 B1 | 5/2002 | Friedman et al. |
| 6,411,604 B1 | 6/2002 | Brockman et al. |
| 6,411,632 B2 | 6/2002 | Lindgren et al. |
| 6,415,027 B1 | 7/2002 | Malik |
| 6,425,009 B1 | 7/2002 | Parrish et al. |
| 6,430,189 B1 | 8/2002 | Juntumaa et al. |
| 6,442,169 B1 | 8/2002 | Lewis |
| 6,459,697 B1 | 10/2002 | Neyman |
| 6,459,783 B1 | 10/2002 | March et al. |
| 6,483,837 B1 | 11/2002 | Howell et al. |
| 6,483,842 B1 | 11/2002 | Mauger |
| 6,487,286 B1 | 11/2002 | Reaves et al. |
| 6,496,512 B1 | 12/2002 | Medhat |
| 6,501,764 B1 | 12/2002 | Fudatate et al. |
| 6,504,923 B1 * | 1/2003 | Swale .................... 379/221.09 |
| 6,507,649 B1 | 1/2003 | Tovander |
| 6,515,985 B2 | 2/2003 | Shmulevich et al. |
| 6,515,997 B1 | 2/2003 | Feltner et al. |
| 6,522,667 B1 | 2/2003 | Oda et al. |
| 6,529,524 B1 | 3/2003 | Liao et al. |
| 6,535,599 B1 | 3/2003 | Torrey et al. |
| 6,542,497 B1 | 4/2003 | Curry et al. |
| 6,546,003 B1 | 4/2003 | Farris |
| 6,553,427 B1 | 4/2003 | Chang et al. |
| 6,563,835 B1 | 5/2003 | Chen |
| 6,574,216 B1 | 6/2003 | Farris et al. |
| 6,577,626 B2 * | 6/2003 | Christie et al. .............. 370/384 |
| 6,584,190 B1 | 6/2003 | Bressler |
| 6,594,246 B1 | 7/2003 | Jorgensen |
| 6,594,258 B1 | 7/2003 | Larson et al. |
| 6,611,532 B1 | 8/2003 | Madour et al. |
| 6,611,533 B1 | 8/2003 | Liao et al. |
| 6,625,170 B1 | 9/2003 | Curry et al. |
| 6,631,133 B1 | 10/2003 | Christie et al. |
| 6,636,504 B1 | 10/2003 | Albers et al. |
| 6,668,051 B1 | 12/2003 | Ashdown et al. |
| 6,674,748 B1 | 1/2004 | Dykhuizen et al. |
| 6,678,242 B1 | 1/2004 | Simon |
| 6,680,953 B1 | 1/2004 | Kim |
| 6,681,009 B1 | 1/2004 | Graf et al. |
| 6,683,881 B1 | 1/2004 | Mijares et al. |
| 6,700,972 B1 | 3/2004 | McHugh et al. |
| 6,724,752 B1 | 4/2004 | Turtiainen et al. |
| 6,731,741 B1 | 5/2004 | Fourcand et al. |
| 6,760,343 B1 | 7/2004 | Krishnamurthy et al. |
| 6,782,004 B1 | 8/2004 | Brusilovsky et al. |
| 6,912,590 B1 | 6/2005 | Lundbäck et al. |
| 6,940,866 B1 | 9/2005 | Miller et al. |
| 6,944,184 B1 * | 9/2005 | Miller et al. ................. 370/467 |
| 6,954,526 B1 | 10/2005 | Glenn et al. |
| 6,965,592 B2 | 11/2005 | Tinsley et al. |
| 6,967,956 B1 | 11/2005 | Tinsley et al. |
| 6,987,781 B1 | 1/2006 | Miller et al. |
| 6,990,089 B2 | 1/2006 | Benedyk et al. |
| 7,002,988 B1 | 2/2006 | Benedyk et al. |
| 7,031,340 B2 | 4/2006 | Sprague et al. |
| 7,046,667 B2 | 5/2006 | Sprague et al. |
| 7,050,456 B1 | 5/2006 | Sprague et al. |
| 7,088,728 B2 | 8/2006 | Delaney et al. |
| 7,113,581 B2 | 9/2006 | Benedyk et al. |
| 7,120,139 B1 | 10/2006 | Kung et al. |
| 7,190,702 B1 | 3/2007 | Sprague et al. |
| 7,242,695 B2 | 7/2007 | Sprague et al. |
| 7,274,662 B1 | 9/2007 | Kalmanek, Jr. et al. |
| 7,318,091 B2 | 1/2008 | Brendes et al. |
| 7,327,670 B2 | 2/2008 | Sprague et al. |
| 2001/0029182 A1 | 10/2001 | McCann et al. |
| 2001/0046227 A1 | 11/2001 | Matsuhira et al. |
| 2001/0046234 A1 | 11/2001 | Agrawal et al. |
| 2001/0049730 A1 | 12/2001 | Brendes et al. |
| 2001/0055380 A1 | 12/2001 | Benedyk et al. |
| 2002/0048360 A1 | 4/2002 | Zambre et al. |
| 2002/0105969 A1 | 8/2002 | Benedyk et al. |
| 2002/0131400 A1 | 9/2002 | Tinsley et al. |
| 2002/0150221 A1 | 10/2002 | Carson et al. |
| 2005/0238036 A1 | 10/2005 | Miller et al. |
| 2005/0265341 A1 | 12/2005 | Benedyk et al. |
| 2005/0286502 A1 | 12/2005 | Benedyk et al. |
| 2006/0013203 A1 | 1/2006 | Benedyk et al. |
| 2006/0013204 A1 | 1/2006 | Benedyk et al. |
| 2006/0013264 A1 | 1/2006 | Eichler et al. |
| 2006/0077978 A1 | 4/2006 | Sprague et al. |
| 2008/0075068 A1 | 3/2008 | Brendes et al. |
| 2008/0075115 A1 | 3/2008 | Brendes et al. |

FOREIGN PATENT DOCUMENTS

| | | |
|---|---|---|
| EP | 0 853 411 | 7/1998 |
| EP | 1 014 735 | 12/1999 |
| EP | 1 054 568 | 5/2000 |
| EP | 1 026 861 A2 | 8/2000 |
| EP | 1 089 575 | 9/2000 |
| EP | 1 206 079 A2 | 5/2002 |
| EP | 1 161 819 B1 | 8/2006 |
| EP | 1 177 660 B1 | 8/2006 |
| EP | 1 135 905 B1 | 10/2006 |
| EP | 1 169 829 B1 | 10/2006 |
| EP | 1 169 816 B1 | 11/2006 |
| EP | 1 192 758 B1 | 2/2007 |
| EP | 1755295 A1 | 2/2007 |
| EP | 1 715 658 B1 | 10/2007 |
| EP | 1 371 246 B1 | 7/2008 |
| EP | 1 314 324 B1 | 8/2008 |
| WO | WO 97/11563 | 3/1997 |
| WO | WO 97/33441 | 9/1997 |
| WO | WO 97/42774 | 11/1997 |
| WO | WO 97/42776 | 11/1997 |
| WO | WO 97/46045 | 12/1997 |
| WO | WO 98/28879 | 7/1998 |
| WO | WO 98/28885 | 7/1998 |
| WO | WO 98/28897 | 7/1998 |
| WO | WO 99/09759 | 2/1999 |
| WO | WO 99/16256 | 4/1999 |
| WO | WO 00/19758 | 4/2000 |
| WO | WO 00/22840 | 4/2000 |
| WO | WO 00/31933 | 6/2000 |
| WO | WO 00/33519 | 6/2000 |
| WO | WO 00/35155 | 6/2000 |
| WO | WO 00/35156 | 6/2000 |
| WO | WO 00/54476 | 9/2000 |
| WO | WO 00/56032 | 9/2000 |
| WO | WO 00/60812 | 10/2000 |
| WO | WO 00/60814 | 10/2000 |
| WO | WO 00/60821 | 10/2000 |
| WO | WO 00/65785 | 11/2000 |
| WO | WO 00/76134 A1 | 12/2000 |

| | | |
|---|---|---|
| WO | WO 01/11825 | 2/2001 |
| WO | WO 01/24499 | 4/2001 |
| WO | WO 01/37532 | 5/2001 |
| WO | WO 01/82635 A1 | 11/2001 |
| WO | WO 01/93526 A2 | 12/2001 |
| WO | WO 02/07455 A1 | 1/2002 |
| WO | WO 00/30369 | 5/2002 |
| WO | WO 02/056618 A2 | 7/2002 |
| WO | WO 02/060192 A2 | 8/2002 |

OTHER PUBLICATIONS

Official Action of the European Patent Office for EP Application No. 00919614.8-2413 (Nov. 10, 2004).
Pai, "In-Building Wireless: The Next Generation," TelephonyOnline.com, pp. 1-4 (Jun. 30, 2004).
Handa, "In Building Wireless: The Next Generation," TMCnet.com, pp. 1-7 (Feb. 12, 2004).
Fitchard, "A New Voice in the Boardroom," Wireless Review, pp. 1-3 (Sep. 1, 2003).
"Fixed Wireless Technology," ISP Planet, pp. 1-4 (May 14, 2002).
Martinek, "Office on the Fly," Wireless Review, pp. 1-4 (Jul. 15, 2001).
"March Networks 3300 Integrated Communications Platform," Mitel Networks Corporation, pp. 1-34 (Jul. 2001).
Swartz, "Ready, Set, Wireless Office!," Wireless Review, pp. 1-4 (Jun. 1, 2000).
"Telstra and Ericsson Trial Next Generation Wireless Office Solution," Ericsson, pp. 1-2 (Apr. 28, 2000).
"Mitel and Ericsson Join Forces to Deliver an Integrated Digital Wireless Office Solution with PBX Functionality-Company Business and Marketing," Cambridge Telcom Report, pp. 1-4 (Apr. 24, 2000).
Commonly-assigned, co-pending U.S. Appl. No. 09/543,135 for "System and Method for Routing Calls From a Voice Network to a Data Communications Network," (Unpublished, filed Apr. 5, 2000).
"Market and Development Agreement Targets Customers Looking for Ways to Become More Productive Through Convenient and Cost-Effective Communication," Ericsson Press Release, pp. 1-2 (Apr. 4, 2000).
Sulkin, "Emerging Options for Wireless PBXs," Voice2000, pp. 1-8 (Feb. 2000).
Drzewianowksi, "WLANs—For the Picking," Communications Solutions™ Next-Gen Networks, pp. 1-9 (Jan. 2000).
"The Wireless Business Connection," Second Quarter 2000 Report, The Phillips Group—Infotech, pp. 1-9 (2000).
"Ericsson Announces General Availability of Its Mobile Advantage Wireless Office System," Ericsson Press Release, pp. 1-2 (Nov. 4, 1999).
O'Shea, "Mating Season," Telephony, p. 10-11, (Sep. 20, 1999).
"Corporate Offices to Go Wireless First Australian GSM on the Net Trial," Ericsson Press Release, pp. 1-3 (Aug. 11, 1999).
"Ericsson Solution Chosen for world's First Combined DECT/GSM Communications Service," Ericsson, pp. 1-9 (Jun. 21, 1999).
Johanson et al., "Mobile Advantage Wireless Office—A Digital Wireless Office System for TDMA/136 Networks," Ericsson Review No. 1, pp. 20-27 (1999).
"Enterprise IP Gateway," Ericsson, pp. 1-6 (1999).
"The Ericsson IPT System," Ericsson, pp. 1-8 (1999).
PCS Access Network Requirements: Interface Specification, Interface: Service Access Socket System Interface (SASSI), Version 01.01, Dec. 3, 1998.
PCS Access Network Requirements: Product Specification, Network Element: Gateway Signal Transfer Point between CCS/SS7 and TCP-IP Networks (GW-STP-IP), Dec. 3, 1998.
"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).
Michael McGrew, "Transport SS7 Signaling Over IP," Lucent Technologies Inc., p. 1-8, (Nov. 1998).
Weekly Status Report for week of Jul. 13-Jul. 17, 1998.
Weekly Status Report for the weeks of Jul. 6-Jul. 10, 1998.
Weekly Status Report for week of Jun. 15-Jun. 18, 1998.
"Ericsson Wireless Office Services to Provide Digital System Through AT&T Wireless Services," Ericsson Press Release, pp. 1-2 (Apr. 17, 1998).
Tekelec, "Eagle® Feature Guide," PN/9110-1225-01, (Jan. 1998).
O'Shea, "The Network That's Never Done," Telephony, p. 38-43, (Sep. 15, 1997).
Tekelec, "Eagle® STP Platform," 980-0134-01, (1997).
Tekelec, Eagle® STP Lan Interface Feature, 908-0134-01, Rev. B (1997).
Tekelec, "Eagle® STP Database Transport Access Feature," 908-0136-01, Rev. B (1997).
Tekelec, "Eagle® STP X.25 to SS7-IS.41 Protocol Conversion Feature," 908-0135-01, Rev. B (1997).
Tekelec, "Eagle® STP ANSI-ITU Gateway Feature," 908-0133-01, Rev. B (1997).
Tekelec, "SS7-Frame Relay Access Device SS7 Protocol Information Translator," 908-0167-01, Rev. A (1997).
Snyder, "Rerouting Internet Traffic Jams," Telephony, p. 12, (Nov. 11, 1996).
Snyder, "Branded With Optics," Telephony, p. 49-50, (Jul. 22, 1996).
Anonymous, "Around the Loop," Telephony, p. 26, (Jul. 22, 1996).
Woods, "Fresno Bee Still Buzzing About Wireless," TechNews, pp. 1-2 (1995).
Official Action of European Patent Application No. 06 005 210.7-2413 (Sep. 6, 2007).
Notification of Transmittal of International Preliminary Examination Report for International Application No. PCT/US00/07876 (Mar. 27, 2001).
Notice of Allowance and Issue Fee due for U.S. Appl. No. 09/205,809 (Feb. 27, 2001).
Final Official Action corresponding to U.S. Appl. No. 09/205,809 (Jan. 3, 2001).
Sidebottom et al., "SS7 MTP3-User Adaptation Layer (M3UA)," Internet Draft, Network Working Groups, pp. 1-79 (Nov. 2000).
Affadavit of Dr. Harry G. Perros (Oct. 11, 2000).
Notification of Transmittal of International Preliminary Examination Report for International Application No. PCT/US99/27572 (Oct. 6, 2000).
Notification of Transmittal of International Preliminary Examination Report for International Application No. PCT/US99/27397 (Oct. 5, 2000).
Stewart et al., "Stream Control Transmission Protocol," Request for Comments: 2960, Network Working Group, pp. 1-124, (Oct. 2000).
"Digital Cellular Telecommunications System (Phase 2+) (GSM); Universal Mobile Telecommunications System (UMTS); Telecommunications Management Charging and Billing; 3G Call and Event Data for the Packet Switched (PS) Domain (3GPP TS 32.015 Version 3.3.0 Release 1999)," Global System for Mobile Communications, pp. 1-65 (Sep. 2000).
Sidebottom et al., "SS7 MTP3-User Adaptation Layer (M3UA)," Internet draft, , IETF Network Working Group, p. 1-75, (Sep. 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).
International Search Report in International Application No. PCT/US00/15561 (Aug. 2, 2000).
Official Action corresponding to U.S. Appl. No. 09/205,809 (Jun. 22, 2000).
Loughney, "IP-Based Signaling Needs in Radio Access Networks," Internet draft, draft-loughney-sigtran-ip-ran-00.txt, IETF SIGTRAN Working Group, p. 1-14, (Jun. 16, 2000).
"GPRS: General Packet Radio Service," Usha Communications Technology, pp. 1-23 (Jun. 2000).
Interview Summary for U.S. Appl. No. 09/205,809 (Apr. 14, 2000).
Loughney et al., "SS7 SCCP-User Adaptation Layer (SUA)," Internet draft, draft-loughney-sigtran-sua-00.txt, IETF Engineering Task Force, p. 1-46, (Mar. 8, 2000).
Official Action corresponding to U.S. Appl. No. 09/205,809 (Feb. 2, 2000).

"Universal Mobile Telecommunications System (UMTS); UTRAN lu Interface: General Aspects and Principles (3G TS 25.410 version 3.1.0 Release 1999)," ETSI, pp. 1-2 (Jan. 2000).

3rd Generation Partnership Project (3GPP), "Technical Specification Group Radio Access Network—UTRAN Overall Description," 3G TS 25.401 version 3.1.0, Release 1999, p. 1-34, (Dec. 17, 1999).

3rd Generation Partnership Project (3GPP), "Technical Specification Group Radio Access Network—UTRAN lu Interface: General Aspects and Principles," 3G TS 25.410 version 3.1.0, Release 1999, p. 1-23, (Dec. 12, 1999).

Arango et al., "Media Gateway Control Protocol (MGCP), Version 1.0," Vertical Networks, RFC 2705, pp. 1-126 (Oct. 1999).

Ong et al., "Framework Architecture for Signaling Transport," Network Working Group, pp. 1-24 (Oct. 1999).

ITU-T Recommendation Q.2630.1 (Sep. 29, 1999).

ITU-T Recommendation Q.2150.1 (Jun. 23, 1999).

Hamdi et al., "Voice Service Interworking for PSTN and IP Networks," IEEE Communications Magazine, p. 104-111, (Jun. 5, 1999).

Sprague et al., "Transport Adapter Layer Interface," Tekelec, p. 1-30, (May 28, 1999).

U.S. Appl. No. 60/132,552 for "Signal Transfer Point with Virtual Backplane" (May 5, 1999).

Lakshmi-Ratan, "The Lucent Technologies Softswitch-Realizing the Promise of Convergence," Bell Labs Technical Journal, p. 174-195, (Apr. 5, 1999).

Handley et al., "SIP: Session Initiation Protocol," Internet Draft, Network Working Group, pp. 1-141 (Mar. 1999).

Bressler, "SS7 Level Two Over IP," Nortel Networks, pp. 1-6 (Jan. 1999).

U.S. Appl. No. 60/110,398 for "Signaling Link with Inherent Redundancy," (Dec. 1, 1998).

Glaude et al., "SS7 to IP Signaling Gateway Transport Architecture," Internet Engineering Task Force, pp. 1-39 (Nov. 27, 1998).

Cuervo et al., "SSS-Internet Interworking—Architectural Framework," pp. 1-9 (Jul. 1998).

Douglas E. Comer, "Internetworking with TCP/IP," Principles, Protocols, and Architecture, 3rd ed., Prentice Hall (New Jersey), p. 6-8 (1995).

Bellcore, "Signaling Transfer Point (STP) Generic Requirements," GR-82-CORE, Issue 1 (Jun. 1994).

Yang et al., "The Design and Implementation of a Service Logic Execution Environment Platform," IEEE, pp. 1911-1917 (1993).

Zaharychuk et al., "Gateway Signal Transfer Points: Design, Services and Benefits," IEEE, pp. 223.2.1-223.2.8, (May 29, 1990).

El-Toumi et al., "Interconnecting SS7 Signaling Networks," AT&T Bell Laboratories, IEEE, pp. 589-593 (1990).

Ex Parte Remark, 1990 WL 354512 (Bd.Pat.App. & Interf. 1990).

Bootman et al., "Generic Building Blocks for the Telecommunications Management Network," IEEE, p. 6.1.1-6.1.5, (1988).

Bootman, "Intelligent Network Services Using a Service Switching Node," IEEE, p. 40.7.1-40.2.4, (1988).

Buckles, "Very High Capacity Signaling Transfer Point For Intelligent Network Services," IEEE, p. 40.2.1-40.2.4 (1988).

*Henry Mfg. Co. Inc.* v. *Commercial Filters Corp*, 350 F.Supp. 1015 (S.D. Indiana 1971).

Communication pursuant to Article 94(3) EPC for European Application No. 07119613.3 (Mar. 17, 2008).

Supplementary European Search Report for European Application No. 00920080.9 (Feb. 14, 2008).

Extended European Search Report corresponding to European Patent No. 07119613.3 (Nov. 30, 2007).

Notice of Allowance and Fee(s) Due for U.S. Appl. No. 10/403,460 (Nov. 2, 2007).

Notice of Allowance and Fee(s) Due for U.S. Appl. No. 09/770,316 (Aug. 13, 2007).

Official Action for U.S. Appl. No. 10/403,460 (May 11, 2007).

Notice of Allowance and Fee(s) Due for U.S. Appl. No. 10/403,455 (May 9, 2007).

Communication pursuant to Article 96(2) EPC for European Application No. 06122282.4 (Apr. 11, 2007).

Communication pursuant to Article 96(2) EPC for European Application No. 00950411.9 (Mar. 2, 2007).

Extended European Search Report for European Patent Application No. 06122282.4 (Jan. 19, 2007).

Notice of Allowance and Fee(s) Due for U.S. Appl. No. 10/403,459 (Dec. 21, 2006).

Advisory Action for U.S. Appl. No. 09/543,135 (Dec. 13, 2006).

Official Action for U.S. Appl. No. 09/770,316 (Dec. 5, 2006).

Communication pursuant to Article 96(2) EPC in European Application No. 01928718.4 (Nov. 20, 2006).

Communication pursuant to Article 96(2) EPC in European Application No. 06005210.7 (Aug. 30, 2006).

Supplemental Notice of Allowability for U.S. Appl. No. 09/839,394 (Aug. 17, 2006).

Official Action for U.S. Appl. No. 09/543,135 (Aug. 16, 2006).

Official Action for U.S. Appl. No. 10/403,460 (Aug. 9, 2006).

Official Action for U.S. Appl. No. 10/403,459 (Aug. 9, 2006).

Official Action for U.S. Appl. No. 10/403,455 (Aug. 9, 2006).

Communication pursuant to Article 96(2) EPC for European Application No. 00950411.9 (Jun. 23, 2006).

Official Action for U.S. Appl. No. 09/543,135 (Jun. 19, 2006).

Extended European Search Report for European Application No. 06005210.7 (Jun. 6, 2006).

Advisory Action for U.S. Appl. No. 09/770,316 (Mar. 21, 2006).

Notice of Panel Decision from Pre-Appeal Brief Review for U.S. Appl. No. 09/770,316 (Feb. 14, 2006).

Notice of Allowance and Fee(s) Due for U.S. Appl. No. 10/403,461 (Feb. 13, 2006).

Communication pursuant to Article 96(2) EPC in European Application No. 01939711.6 (Feb. 6, 2006).

Supplemental Notice of Allowability for U.S. Appl. No. 09/443,712 (Jan. 31, 2006).

Supplemental Notice of Allowability for U.S. Appl. No. 09/588,852 (Dec. 22, 2005).

Notice of Allowance and Fee(s) Due for U.S. Appl. No. 10/403,457 (Dec. 6, 2005).

Supplemental Notice of Allowability for U.S. Appl. No. 09/735,142 (Dec. 5, 2005).

Communication pursuant to Article 96(2) EPC in EP Patent Application No. 01989213.2 (Nov. 7, 2005).

Advisory Action for U.S. Appl. No. 09/543,135 (Sep. 21, 2005).

Official Action for U.S. Appl. No. 09/443,712 (Sep. 21, 2005).

Supplemental Notice of Allowability for U.S. Appl. No. 09/559,767 (Sep. 2, 2005).

Supplemental Notice of Allowability for U.S. Appl. No. 09/534,281 (Aug. 25, 2005).

Official Action for U.S. Appl. No. 09/770,316 (Jul. 27, 2005).

Notice of Allowance and Fee(s) Due for U.S. Appl. No. 09/768,881 (Jun. 2, 2005).

Official Action for U.S. Appl. No. 10/403,457 (May 19, 2005).

Official Action for U.S. Appl. No. 10/403,461 (May 17, 2005).

Notice of Allowance and Fee(s) Due for U.S. Appl. No. 09/537,835 (Apr. 19, 2005).

Official Action for U.S. Appl. No. 09/543,135 (Mar. 30, 2005).

Communication pursuant to Article 96(2) EPC for European Application No. 01989213.2 (Mar. 7, 2005).

Supplemental Notice of Allowability for U.S. Appl. No. 09/541,853 (Mar. 7, 2005).

Notice of Allowance in U.S. Appl. No. 09/588,852 (Mar. 2, 2005).

Notice of Allowance and Fee(s) Due for U.S. Appl. No. 09/618,807 (Feb. 25, 2005).

Notice of Allowance and Fee(s) Due for U.S. Appl. No. 09/735,142 (Feb. 14, 2005).

Notification of Transmittal of International Preliminary Examination Report for International Application No. PCT/US00/08837 (Feb. 7, 2005).

Notification of Transmittal of International Preliminary Report on Patentability for International Application No. PCT/US01/48269 (Jan. 11, 2005).

Official Action for U.S. Appl. No. 09/443,712 (Dec. 29, 2004).

Official Action for U.S. Appl. No. 09/768,881 (Dec. 14, 2004).

Communication pursuant to Article 96(2) EPC for European Application No. 00939602.9 (Dec. 10, 2004).

Notice of Allowance and Fee(s) Due for U.S. Appl. No. 09/534,281 (Nov. 29, 2004).

Notice of Allowance and Fee(s) Due for U.S. Appl. No. 09/559,767 (Nov. 17, 2004).
Notice of Allowance and Fee(s) Due for U.S. Appl. No. 09/541,853 (Nov. 17, 2004).
Communication under Rule 112 EPC in European Application No. 01989213.2 (Nov. 17, 2004).
Official Action for U.S. Appl. No. 09/770,316 (Nov. 3, 2004).
Communication pursuant to Article 96(2) EPC for European Application No. 99965846.1 (Sep. 21, 2004).
Notice of Allowance and Fee(s) Due for U.S. Appl. No. 09/839,394 (Aug. 24, 2004).
Notice of Allowance and Fee(s) Due for U.S. Appl. No. 09/618,807 (Jul. 27, 2004).
Official Action for U.S. Appl. No. 09/541,853 (Jul. 15, 2004).
Restriction and/or Election Requirement for U.S. Appl. No. 09/770,316 (Jun. 14, 2004).
Official Action for U.S. Appl. No. 09/537,835 (Jun. 4, 2004).
Official Action for U.S. Appl. No. 09/735,142 (May 27, 2004).
Official Action for U.S. Appl. No. 09/543,135 (May 13, 2004).
Official Action in U.S. Appl. No. 10/403,457 (May 6, 2004).
Communication pursuant to Article 96(2) EPC for European Application No. 00928464.7 (Apr. 16, 2004).
Non-Final Official Action in U.S. Appl. No. 09/588,852 (Apr. 13, 2004).
Official Action for U.S. Appl. No. 09/559,767 (Feb. 26, 2004).
Official Action for U.S. Appl. No. 09/443,712 (Feb. 17, 2004).
Official Action for U.S. Appl. No. 09/768,881 (Jan. 9, 2004).
Restriction Requirement in U.S. Appl. No. 09/588,852 (Dec. 30, 2003).
Official Action for U.S. Appl. No. 09/839,394 (Dec. 1, 2003).
Communication pursuant to Article 96(2) EPC for European Application No. 00919979.5 (Nov. 18, 2003).
Communication pursuant to Article 96(2) EPC for European Application No. 00919614.8 (Nov. 17, 2003).
Notification of Transmittal of International Preliminary Examination Report for International Application No. PCT/US02/01977 (Nov. 10, 2003).
Official Action for U.S. Appl. No. 09/541,853 (Oct. 31, 2003).
Official Action for U.S. Appl. No. 09/618,807 (Oct. 22, 2003).
Notification of Transmittal of International Preliminary Examination Report for International Application No. PCT/US02/01977 (Sep. 23, 2003).
Official Action for U.S. Appl. No. 09/537,835 (Sep. 16, 2003).
Official Action for U.S. Appl. No. 09/443,712 (Aug. 18, 2003).
Official Action for U.S. Appl. No. 10/403,457 (Aug. 13, 2003).
Official Action for U.S. Appl. No. 09/543,135 (Jul. 25, 2003).
Restriction and/or Election Requirement for U.S. Appl. No. 09/541,853 (Jul. 16, 2003).
Notification of Transmittal of the International Search Report or the Declaration in International Application No. PCT/US01/48269 (May 22, 2003).
Written Opinion for International Application No. PCT/US02/01977 (May 21, 2003).
Official Action for U.S. Appl. No. 09/768,881 (May 9, 2003).
Official Action for U.S. Appl. No. 09/618,807 (Apr. 15, 2003).
Official Action for U.S. Appl. No. 09/443,712 (Mar. 14, 2003).
Invitation to Pay Additional Fees for International Application No. PCT/US01/48269 (Feb. 26, 2003).
Restriction and/or Election Requirement for U.S. Appl. No. 09/443,712 (Jan. 29, 2003).
Notification of Transmittal of International Preliminary Examination Report for International Application No. PCT/US01/12922 (Apr. 3, 2002).
International Search Report for International Application No. PCT/US01/17483 (Mar. 25, 2002).
Written Opinion for International Application No. PCT/US01/12922 (Feb. 13, 2002).
Notice of Allowance and Issue Fee Due for U.S. Appl. No. 09/205,809 (Sep. 25, 2001).
Notification of Transmittal of International Preliminary Examination Report for International Application No. PCT/US00/11322 (Aug. 2, 2001).
Notification of Transmittal of International Preliminary Examination Report for International Application No. PCT/US00/08614 (Jul. 30, 2001).
Supplemental Notice of Allowability for U.S. Appl. No. 09/205,809 (May 23, 2001).
Supplementary European Search Report for European Application No. 05763616.9 (Feb. 4, 2009).
Notice of Allowance and Fee(s) Due for U.S. Appl. No. 11/184,439 (Dec. 29, 2008).
Notice of Allowance and Fee(s) Due for U.S. Appl. No. 10/890,779 (Dec. 15, 2008).
Interview Summary for U.S. Appl. No. 11/184,632 (Dec. 5, 2008).
Interview Summary for U.S. Appl. No. 10/890,779 (Nov. 4, 2008).
Communication pursuant to Article 94(3) EPC for European Application No. 01 939 711.6 (Nov. 4, 2008).
Official Action for U.S. Appl. No. 10/890,779 (May 2, 2008).
Official Action for U.S. Appl. No. 10/890,779 (Sep. 20, 2007).
Notification of European Publication Number and Information on the Application of Article 67(3) EPC for European Application No. 05763616.9 (Mar. 21, 2007).
Communication pursuant to Rules 109 and 110 EPC for European Application No. 05763616.9 (Mar. 1, 2007).
Notification of Transmittal of the International Search Report and the Written Opinion of the International Searching Authority, or the Declaration in International Application No. PCT/US05/23456 (May 10, 2006).
Telcordia Technologies Specification of Signaling System No. 7, "Annex A: SS7 Message Priorities," GR-246-CORE, Issue 8 (Dec. 2003).
Nichols et al., "Definition of the Differentiated Services Field (DS Field) in the IPv4 and IPv6 Headers," Internet Engineering Task Force RFC 2474, pp. 1-20 (1998).
Almquist, "Type of Service in the Internet Protocol Suite," Internet Engineering Task Force RFC 1349, pp. 1-28 (Jul. 1992).
Internet Engineering Task Force RFC 791, University of Southern California, "Internet Protocol DARPA Internet Program Protocol Specification," pp. 1-45 (Sep. 1981).
Official Action for U.S. Appl. No. 11/184,632 (Sep. 26, 2008).
Official Action for U.S. Appl. No. 11/180,028 (Sep. 4, 2008).
Official Action for U.S. Appl. No. 10/184,629 (Sep. 2, 2008).
Official Action for U.S. Appl. No. 11/130,422 (Aug. 14, 2008).
Decision to grant a European patent pursuant to Article 97(1) EPC for European Patent No. 1314324 (Jul. 31, 2008).
Notice of Allowance and Fee(s) Due for U.S. Appl. No. 11/184,439 (Jul. 30, 2008).
Communication pursuant to Article 94(3) EPC for European Application No. 00920080.9 (Jun. 27, 2008).
Official Action for U.S. Appl. No. 11/282,966 (Jun. 23, 2008).
Communication pursuant to Article 94(3) EPC for European Application No. 02705919.5 (May 27, 2008).
Official Action for U.S. Appl. No. 11/180,028 (May 5, 2008).
Official Action for U.S. Appl. No. 11/184,632 (Apr. 25, 2008).
Notice of Allowance and Fee(s) Due for U.S. Appl. No. 11/130,422 (Feb. 9, 2009).

* cited by examiner

DAC PROCESS DATABASE — 526

| KEY | | DATA FIELDS | | | | | |
|---|---|---|---|---|---|---|---|
| PC | SSN | Host | Port | Protocol | TT | Status | Congestion | Owner |
| 2-1-1 | 50 | 10.20.30.40 | 5230 | SQL | CNAM | Avail. | 25% | BellAtlantic |
| 2-1-1 | 50 | 10.21.30.41 | 5340 | ODBC | CNAM | OOS | 0% | Illuminet |
| 2-1-1 | 20 | 11.22.30.42 | 5450 | SQL | 800 | Avail. | 78% | BellAtlantic |
| 2-1-1 | 30 | 12.23.30.43 | 5780 | TCAP | CNAM | Avail. | 47% | Illuminet |

Figure 4

METHODS AND SYSTEMS FOR PROVIDING DATABASE NODE ACCESS CONTROL FUNCTIONALITY IN A COMMUNICATIONS NETWORK ROUTING NODE

RELATED APPLICATIONS

This application is a continuation of 09/537,835 filed Mar. 29, 2000 (now U.S. Pat. No. 6,944,184), which is a continuation-in-part of U.S. patent application Ser. No. 09/205,809, filed Dec. 4, 1998 (now U.S. Pat. No. 6,324,183), a continuation-in-part of U.S. patent application Ser. No. 09/443,712, filed Nov. 19, 1999 (now U.S. Pat. No. 7,050,456), and claims the benefit of U.S. Provisional Patent Application Ser. No. 60/127,889, filed Apr. 5, 1999, the disclosures of each of which are incorporated herein by reference in their entirety.

TECHNICAL FIELD

The present invention relates to the routing of signaling messages in a communications network, and more particularly to methods and systems for routing signaling messages destined for database network elements.

BACKGROUND ART

In modern telephony networks, service control points (SCPs) serve as an interface to telephony related databases, such as: call management services databases (CMSDB); line information databases (LIDB); and business services databases (BSDB). These databases are used, at least in part, to facilitate a variety of advanced intelligent network (AIN) related services including: find me service; follow me service; computer security service; call pickup service; store locator service; call waiting service; call block service; calling name delivery service; three way calling service; and 800 number services.

With particular regard to find me service, this service allows calls to be forwarded to another location. The difference between this feature and current call forwarding functionality is the ability to screen unwanted calls from forwarding. Only authorized callers are forwarded to the new location. Similarly, follow me service allows a number to be forwarded on a time schedule. The subscriber determines the time forwarding is to take place when the feature is invoked. Destinations can include both wired and wireless telephones or handsets.

Computer security service allows subscribers to prevent unauthorized callers from accessing a computer or application services. Only callers with the authorized access code or calling from an authorized number can access the services. The SS7 network delivers the calling party number to the destination end office. This number is then checked in a database located with a service control point (SCP), and, if authorized, is allowed to connect with the application. With call pickup service, when a call is placed to a number and is unanswered, the called party can be paged via radio pager. The called party can then dial a code from any telephone at any location and immediately be connected with the waiting caller. With regard to paging type services, manufacturers of such personal communications services (PCS) devices have to date developed two-way pagers that connect a caller with the party being paged. The pager is a two-way transceiver capable of receiving calls (pages) and connecting the caller with the paged party.

Store locator service allows businesses to advertise one number, and have callers automatically transferred to the nearest location based on the caller's telephone number. This allows businesses to advertise nationwide for all locations without special ads that are region specific. The calling party number is matched in a routing database located at an SCP, and the SCP provides the end office with the routing instructions based on the calling party number. With call routing service, businesses can reroute calls during periods of excessively high call volumes or after business hours.

It will be further appreciated that such telephony service databases may also be employed to provide communication service subscribers the flexibility to easily port their service from one communication service provider to another (i.e., number portability or local number portability). The application of such SCP-type database services is not limited to the traditional wired public switched telephone network (PSTN), but is also widely implemented in the wireless telecommunications industry. Typical wireless network communication database applications include; home location registers (HLRs), visitor location registers (VLRs), authentication centers (AuCs), and equipment identification registers (EIRs). In general, SCPs are the network elements that include database systems for providing the services discussed above.

It will also be appreciated that with the continuing convergence of traditional data networks and traditional telecommunication networks, the number and variety of converged or inter-network service related database applications designed to service the needs of combined data-telecommunications subscribers (e.g., presence service databases) will increase dramatically in the future.

With particular regard to traditional SCP network database elements, those skilled in the art of telecommunication network services will appreciate that an SCP is typically comprised of both a front end computer processor system and a back end database system. That is, the SCP front end processor (FEP) system typically does not store or contain the bulk data or information, but instead is the interface to a mainframe or minicomputer system that holds the actual database. Typically, there is a one-to-one correspondence between each FEP and an associated back end computing platform. In a signaling system 7 (SS7) signaling network environment, communication between an SCP front end and other nodes in the SS7 network is accomplished via dedicated SS7 communication links, while communication between the SCP front end and mainframe database back end is typically affected via a TCP/IP connection (or X.25 in older legacy systems). However, it should be noted that even within the telecommunications industry it is not uncommon to hear the term SCP used to describe the combination of front-end processors and mainframe back end database systems.

From an accessibility standpoint, the SS7 network address component of an SCP front end is a point code (PC), while the address component of an application residing on the database back end is referred to as a subsystem number (SSN). A single SCP may contain multiple applications and databases, and as such, there may be multiple subsystem numbers associated with a single SCP point code. Consequently, each SCP must be assigned a unique SS7 network address PC, but may have multiple back end database subsystems provisioned under each unique SS7 network address PC.

Typically, the front end of an SCP located in an SS7 network can perform protocol conversion from SS7 to TCP/IP (or SS7 to X.25 in the case of legacy systems), or it may provide the capability of communicating with the associated back end database directly through the use of primitives. A primitive is an interface that provides access from one level of the protocol to another level. In the case of back end databases, each database is considered to be an application entity, and the protocol used to access and interface to each application entity is known as transaction capabilities application part or TCAP.

Shown in FIG. 1 is an example of a prior art telecommunications network, generally indicated by the numeral 100, that provides AIN-type functionality similar to that described above. Telecommunications network 100 includes an originating end office (EO) or service switching point (SSP) 110, a signal transfer point (STP) 112, a first SCP 116, a second SCP 120, and a third SCP 124. It will be appreciated from FIG. 1 that SSP 110 has a network address PC of 3-1-1, STP 112 has a PC of 2-1-1, SCP 116 has a PC of 1-1-1 and a SSN of 20, SCP 120 has a PC of 1-1-2 and a SSN of 20, and SCP 124 has a PC of 1-1-3 and SSN of 20. As further indicated in FIG. 1, SSP 110 is coupled to STP 112 via a dedicated SS7 communication link 114, which is in turn communicatively coupled to each of the three SCP nodes via dedicated SS7 communication links 118, 122, and 126. With regard to the SCP nodes 116, 120, and 124, it will be appreciated from FIG. 1 that each overall SCP node is comprised of a number of components or sub-systems. More particularly, SCP 116 generally includes a front end processor (FEP) 128, which is coupled to a back end database (BED) 130 via a communication link or bus 132.

Given the above description of network 100, it will be appreciated by one skilled in the art of telecommunication signaling operations that if, for instance, Calling Name (CNAM) service is requested by a subscriber that is serviced by SSP 110, then SSP 110 will be required to formulate and send a CNAM query-type SS7 signaling message to STP 112 via the dedicated SS7 communication link 114. If it is also assumed that a database application corresponding to SSN 20 of SCP 116 is provisioned to provide CNAM-type information, then CNAM query message will either be addressed directly to the PC & SSN of SCP 116 (i.e., PC: 1-1-1, SSN: 20), or the CNAM query message will be addressed so as to request a final destination address translation at the STP 112 (i.e., through global title translation). For purposes of illustration, it is assumed that global title translation service is not required and, consequently, that the CNAM query message is addressed directly to SCP 116 (i.e., PC: 1-1-1, SSN: 20). As such, the CNAM query message is received by STP 112 and subsequently routed over communication link 118 to FEP 128. FEP 128 in turn receives the CNAM query message, processes the message, and facilitates access to the CNAM data stored in the BED 130. Ultimately, a CNAM reply message addressed to SSP 110 (PC: 3-1-1) is formulated and transmitted back to STP 112, which in turn routes the message to SSP 110.

As described above, each complete SCP unit is equipped with a front end processor that is responsible for managing the unit's associated database resources. Such management functions include: protocol conversion, message parsing, administration of inbound queries and outbound responses, load sharing, etc. Each front end processor is integral with the SCP unit and consequently, there is a one-to-one relationship that exists between front end processors and SCP units. Front end processors are expensive, and what is needed is a way to reduce the overall cost of SCP units by allowing one front end processor to drive multiple SCP units.

Therefore, what is needed is a system and method of incorporating SCP front end processing functionality within a communications network routing node such that multiple SCP back ends can be serviced by the single routing node. Furthermore, the SS7 signaling links typically employed to connect to SCP units are capital intensive and expensive to maintain. Consequently, a method of connecting to SCP units that does not require dedicated, expensive SS7 signaling links is also needed.

SUMMARY

According to one aspect, the present invention includes a communications network element that is capable of generally routing messages and also performing load sharing, protocol conversion, and other services that have traditionally been provided by SCP front end processing (FEP) modules. The FEP routing node includes a communication module or modules capable of transmitting and receiving data packets over both SS7 and IP networks. A message discrimination process examines incoming data packets and subsequently directs certain packets to a database access control process that administers database lookup, protocol translation, and other FEP related processing services.

The functions for providing database access control are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing database access control are described below as being associated with cards or subsystems within a routing node. It is understood that these cards or subsystems include hardware for storing and executing the processes and modules. For example, each card or subsystems described below may include one or more microprocessors, such as a Pentium® processor available from Intel Corporation, and associated memory.

Accordingly, it is an object of the present invention to provide a routing node that offers centralized front end processing functionality to multiple SCP back ends.

It is yet another object of the present invention to provide a routing node that facilitates load sharing functionality among multiple SCP back ends.

It is yet another object of the present invention to provide a routing node that facilitates message protocol translation. It is yet another object of the present invention to provide a method of eliminating the need for SS7 network point codes associated with SCP nodes.

It is yet another object of the present invention to provide a method of creating a virtual SCP that is comprised of multiple SCP back end databases, where the virtual SCP is assigned a single SS7 network point code.

It is yet another object of the present invention to provide a method of mapping multiple SCP nodes to a single SS7 network point code.

It is yet another object of the present invention to provide a method of allowing all messages requiring SCP service to be addressed to an SS7 point code that is the same as the SS7 point code of a router of the present invention.

It is yet another object of the present invention to provide a method of allowing messages to be routed based on the ownership of a database or SCP node.

Some of the objects of the invention having been stated hereinabove, other objects will become evident as the description proceeds, when taken in connection with the accompanying drawings as best described hereinbelow.

BRIEF DESCRIPTION OF THE DRAWINGS

Embodiments of the invention will now be described with reference to the accompanying drawings, of which:

FIG. 4 is a table that illustrates a sample database access control (DAC) database structure and data used in a preferred embodiment of a packet routing node of the present invention;

DETAILED DESCRIPTION

Figure 2:
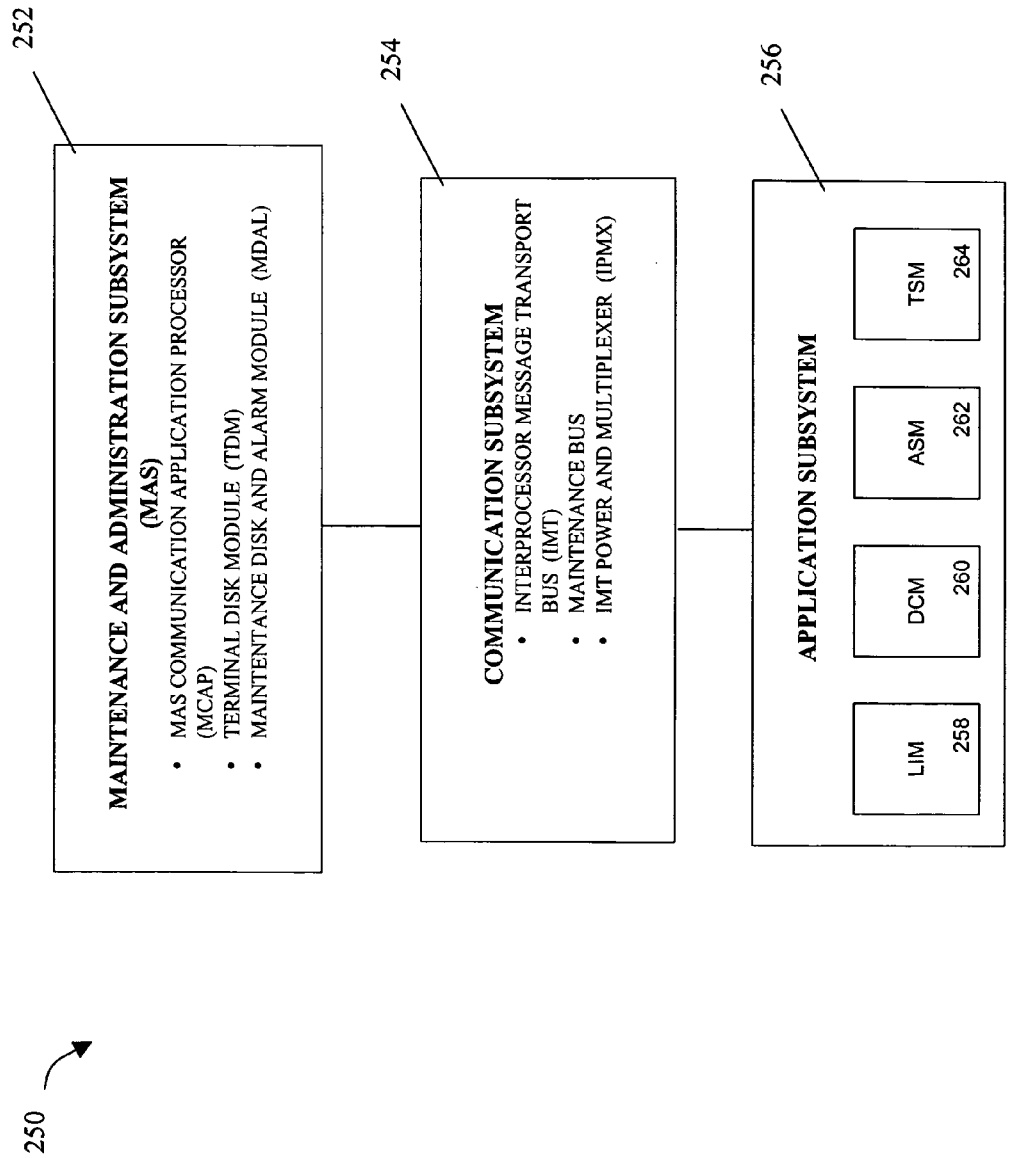
FIG. 2 is a schematic diagram of an STP switching node.

Disclosed herein are several embodiments of the present invention, all of which include a network element that performs functions similar to that of a traditional telecommunications network packet routing switch, such as a signal transfer point (STP). Each of the embodiments described and discussed below, employs an internal architecture similar to that of high performance STP and signaling gateway (SG) products which are marketed by Tekelec, Inc. of Calabasas, Calif. as the Eagle® STP and IP$^7$ Secure Gateway™, respectively. A block diagram that generally illustrates the base internal architecture of the IP$^7$ Secure Gateway™ product is shown in FIG. 2. A detailed description of the Eagle® STP may be found in the *Eagle® Feature Guide* PN/910-1225-01, Rev. B, January 1998, published by Tekelec, the disclosure of which is incorporated herein by reference in its entirety. Similarly, a detailed description of the IP$^7$ Secure Gateway™ may be found in Tekelec publication PN/909-0767-01, Rev B, August 1999, titled *Feature Notice IP$^7$ Secure Gateway™ Release* 1.0, the disclosure of which is incorporated by reference in its entirety. The specific functional components of an IP$^7$ Secure Gateway™ for transmitting and receiving TCAP messages over an Internet protocol (IP) network are described in above-referenced, co-pending U.S. patent application Ser. No. 09/205,809. As described in the above referenced *Eagle® Feature Guide*, an Eagle® STP 250 includes the following subsystems: a maintenance and administration subsystem (MAS) 252, a communication subsystem 254 and an application subsystem 256. The MAS 252 provides maintenance communications, program load, user interface, alarm processing and system disks. The communication subsystem 254 includes an interprocessor message transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including but not limited to: a1 link interface module (LIM) 258 that provides SS7 links and X.25 links, a database communication module (DCM) 260 that provides an IP interface using transmission control protocol (TCP), and an application service module (ASM) 262 that provides global title translation, gateway screening and other services. A translation service module (TSM) 264 may also be provided to support triggered local number portability service. Once again, a detailed description of the Eagle® STP is provided in the above-cited *Eagle® Feature Guide* and need not be described in detail herein. It should also be appreciated that, in addition to conventional SS7 LIM cards, a database communication module (DCM) can be employed in a similar manner to provide for the transport of IP encapsulated SS7 messages over an IP network, as described in the above referenced *Feature Notice IP$^7$ Secure Gateway Release* 1.0 publication. With particular regard to the TSM triggered LNP services module mentioned above, a detailed description of the Tekelec triggered LNP solution may be found in the *Feature Guide LNP LSMS PN/*910-1598-01, Rev. A, January 1998, published by Tekelec, the disclosure of which is incorporated herein by reference in its entirety. Furthermore, systems and methods for providing triggerless LNP functionality within a network routing node are described in commonly-assigned, co-pending U.S. patent application Ser. No. 09/503,541, the disclosure of which is incorporated herein by reference in its entirety.

Integrated DAC Database Embodiment

Figure 3:
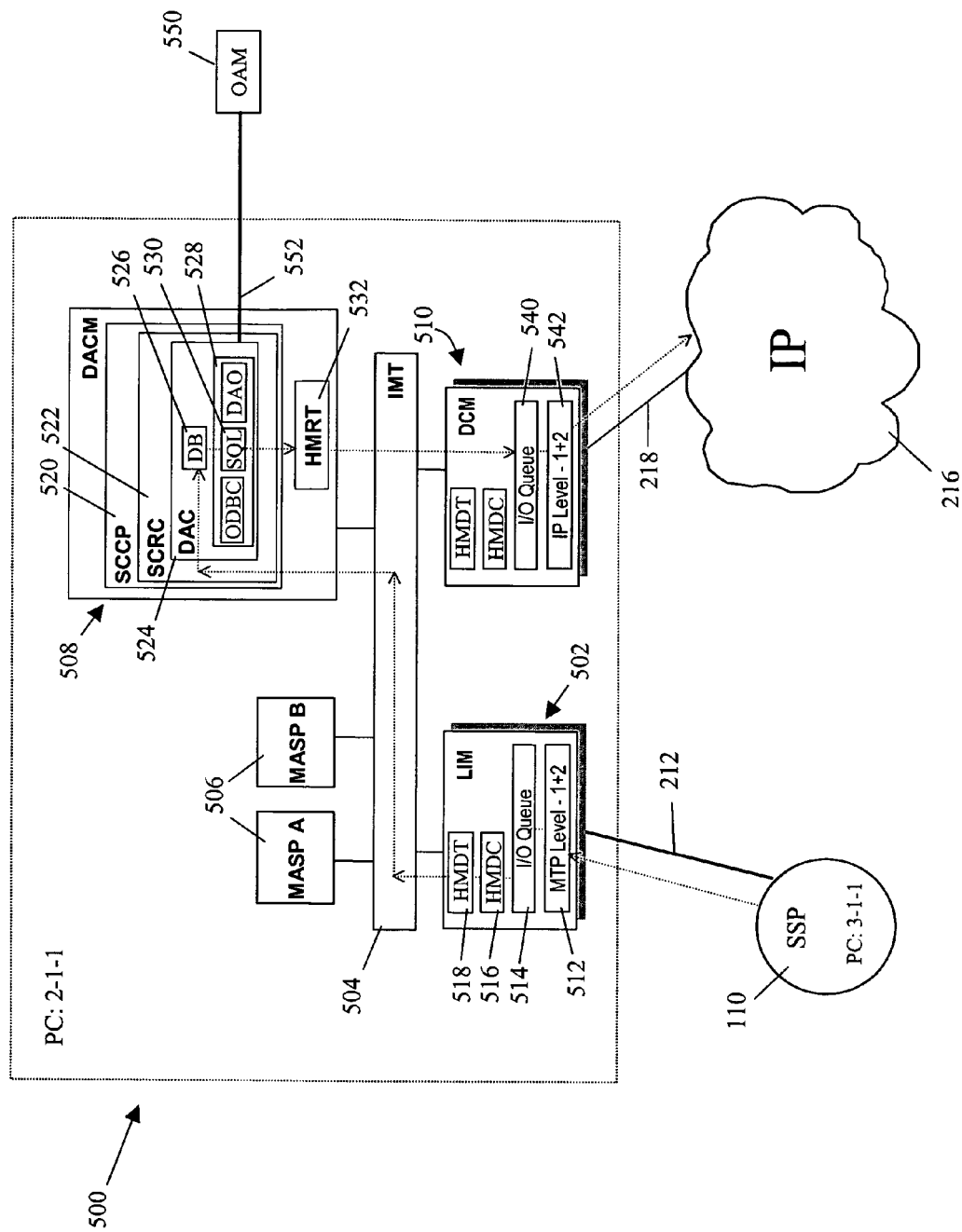
FIG. 3 is a schematic and message flow diagram of a system architecture according to a preferred embodiment of a packet routing node of the present invention, generally indicating message flow associated with an incoming SCP query packet.

Shown in FIG. 3 is a front end processing (FEP) packet routing node of the present invention that is generally indicated by the numeral 500. It will be appreciated that FEP routing node 500 is communicatively coupled to an EO or SSP 110 via an SS7 signaling link 212, and to an IP data network 216 via an IP connection 218. As further illustrated in FIG. 3, FEP packet routing node 500 includes a high speed interprocessor message transport (IMT) communications bus 504. Communicatively coupled to IMT bus 504 are a number of distributed processing modules or cards including: a pair of maintenance and administration subsystem processors (MASPs) 506; an SS7 capable link interface module (LIM) 502; an IP capable database communication module (DCM) 510; and a database access control module (DACM) 508. These modules are physically connected to the IMT bus 504 such that signaling and other type messages may be routed internally between all active cards or modules. For simplicity of illustration, only a single LIM 502, DCM 510 and DACM 508 are included in FIG. 3. However, it should be appreciated that the distributed, multi-processor architecture of the FEP routing node 500 facilitates the deployment of multiple LIM, DCM, DACM and other cards, all of which could be simultaneously connected to and communicating via IMT bus 504.

MASP pair 506 implement the maintenance and administration subsystem functions described above. As the MASP pair 506 are not particularly relevant to a discussion of the flexible routing attributes of the present invention, a detailed discussion of their function is not provided herein. For a comprehensive discussion of additional MASP operations and functionality, the above-referenced Tekelec publications can be consulted.

Focusing now on LIM card functionality, it will be appreciated that LIM 502 is comprised of a number of sub-component processes including, but not limited to; SS7 MTP level 1 and 2 processes 512, an I/O buffer or queue 514, an SS7 MTP level 3 HMDC process 516, and an HMDT process 518. MTP level 1 and 2 processes 512 provide the facilities necessary to send and receive digital data over a particular physical media/physical interface, as well as to provide error detection/correction and sequenced delivery of all SS7 message packets. I/O queue 514 provides for temporary buffering of incoming and outgoing signaling message packets. MTP level 3 HMDC process 516 receives signaling messages from the lower processing layers and performs a discrimination function, effectively determining whether an incoming SS7 message packet requires internal processing or is simply to be through switched. HMDT process 518 handles internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

DCM 510, shown in FIG. 3, generally includes an I/O buffer or queue 540 and an IP level 1 & 2 process 542. It will be appreciated that outgoing message packets routed through the DCM 510 will be transmitted out of the FEP routing node 500 and into IP network 216 via IP communication link 218. As the SS7 and IP communication protocols are not inherently compatible, all SS7 message packets that are to be sent into the IP network 216 are first encapsulated within a TCP/IP routing envelope prior to transmission. This IP encapsulation is performed on the DCM 510 by the IP level 1 & 2 process 542. Preferred packet formats for encapsulating various types of SS7 messages in IP packets are described in Internet Engineering Task Force (IETF) INTERNET DRAFT entitled "Transport Adapter Layer Interface", May 28, 1999, the disclosure of which is incorporated herein by reference in its entirety. Furthermore, a Tekelec Transport Adapter Layer Interface (TALI™) is described in commonly-assigned, co-pending U.S. Provisional Patent Application Ser. No. 60/137, 988, the disclosure of which is incorporated herein by reference in its entirety.

Once. again, the description of LIM and DCM sub-components provided above is limited to those sub-components that are relevant to the sample implementation scenarios illustrated herein. For a comprehensive discussion of additional LIM and DCM operations and functionality, the above-referenced Tekelec publications can be consulted.

With regard to DACM card 508, it will be appreciated from FIG. 3 that DACM generally includes the database and control processes necessary to achieve the front end processing (FEP) functionality of the present invention. The DACM 508 shown in FIG. 3 is comprised, in part, of a signaling connection control part (SCCP) subsystem 520, an SCCP controller, known as a signaling connection routing controller (SCRC) process 522, and a database access control (DAC) process 524. SCCP subsystem 520 is responsible for receiving and preliminary processing of incoming SCCP protocol message packets. The SCRC process 522 is responsible for discrimination of signaling messages at the SCCP level, and for distributing the signaling messages to a higher processing level when appropriate. In the configuration shown in FIG. 3, the next highest processing level is represented by the DAC process 524.

DAC process 524 includes a DAC database 526 and a DAC protocol translation process 528, as indicated in FIG. 3. DAC process 524 is generally responsible for examining properties or characteristics of an incoming message and determining what, if any, processing is required. Such incoming message properties or characteristics might include, but are not limited to: the origination point code (OPC); destination point code (DPC); subsystem (SSN); and translation type (TT). DAC process 524 is also responsible for monitoring and storing information related to the operating status of network database or SCP nodes which have been provisioned for FEP servicing by the FEP routing node 500. Such operating status information is also stored in DAC database 526 and might include, but is not limited to: node In Service/node Out Of Service indicators; overall node congestion indicators; and link specific congestion indicators. In addition to operating status type information, DAC database 526 can also contain information related to database or SCP node ownership. Consequently, message routing decisions can be based, at least in part, upon database or SCP node ownership. Along with such operating status and ownership information, the DAC database 526 maintains a set of SS7 to IP routing address translation instructions, all of which are generally illustrated in FIG. 4. It will be further appreciated that DAC protocol translation process 528 is provisioned to translate an incoming database query or response message into any of a variety of provisioned database protocols (e.g., structured query language (SQL), open database connectivity (ODBC), etc.) depending upon the protocol dictated by a particular SCP or database node. Once DAC processing is complete, the resulting message is passed to an HMRT process 532 for internal routing to the appropriate outbound LIM or DCM module.

It will be appreciated from FIG. 3 that DACM 508 is in communication with and serviced by an Operations Administration and Maintenance (OAM) system 550. In general, an OAM system provides a mechanism whereby network routing address information contained within the DAC process 524 can be externally provisioned or dynamically updated. As the interaction between FEP routing node 500 and OAM 550 is not particularly relevant to the present invention, a detailed discussion of such OAM system functionality will not be presented herein. It should suffice to state that the OAM 550 maintains the routing database component of the DAC process 524 with the most current network routing address information available at any given time.

In the embodiment shown in FIG. 3, the DAC process 524 resides in one or more blocks of high speed random access memory (RAM) that are located on DACM card 508. However, it will be appreciated by those skilled in the art of high-performance computing systems that such a software process and any databases associated therewith could be configured such that some or all of the information is stored on a high density, fast access physical storage media such as magnetic or optical discs.

As indicated in FIG. 4, the DAC database component 526 is comprised of a series of entries or records, with each record containing a number of data fields including, but not limited to: a point code (PC) field; a subsystem (SSN) field; an IP host name field; an IP port field; a database or SCP node protocol field; a service or translation type (TT) field; a node status field; a node congestion field; and an owner field.

Once again, DACM 508 also contains HMRT process 532 that is responsible for the routing of message packets once DAC processing has been completed. That is, the HMRT process 532 determines to which DCM or LIM card a message packet should be internally routed for subsequent outbound transmission into the communication network.

Figure 5:
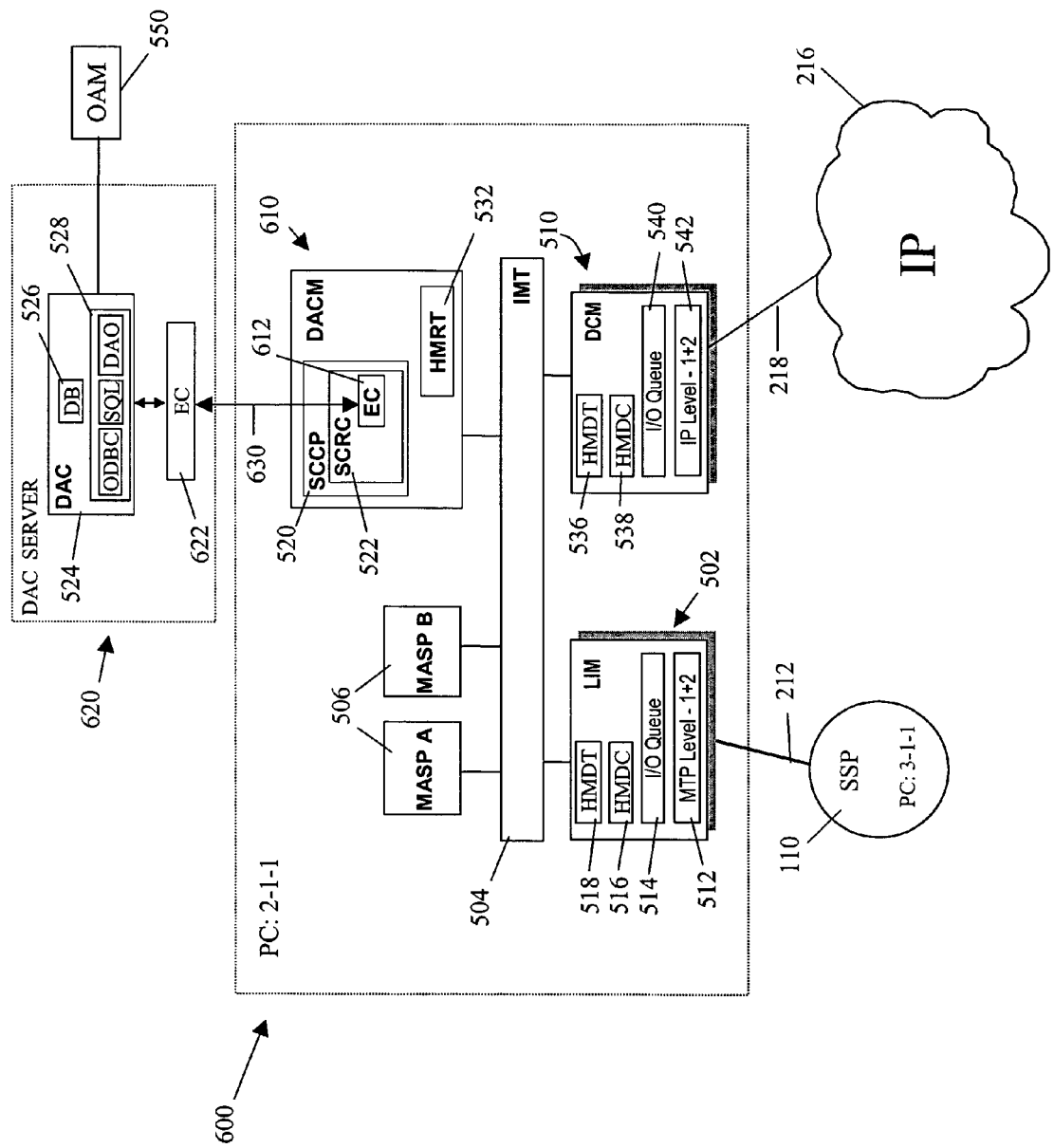
FIG. 5 is a schematic diagram of a system architecture according to another embodiment of a packet routing node of the present invention, generally illustrating an externally mounted DAC process.

Shown in FIG. 5 is another embodiment of the FEP routing node of the present invention, generally indicated by the numeral 600. FEP routing node 600 is identical in overall function to the FEP routing node embodiment illustrated in FIG. 3 and described above. In most respects, the form of FEP routing node 600 is identical to the FEP routing node 500 shown in FIG. 3. That is, FEP packet router node 600 generally includes a high speed interprocessor message transport (IMT) communications bus 504, and a number of distributed processing modules or cards including; a pair of maintenance and administration subsystem processors (MASPs) 506, an SS7 capable link interface module (LIM) 502, an IP capable database communication module (DCM) 510. Once again, it will be appreciated that these modules are physically connected to IMT bus 504 such that signaling and other type messages may be routed internally between all active cards or modules and that, for simplicity of illustration, only a single LIM 502 and DCM 510 are depicted. However, as with node 500, it should be appreciated that the distributed, multi-processor architecture of FEP routing node 600 also facilitates the deployment of multiple LIM, DCM and other cards, all of which could be simultaneously connected to and communicating via IMT bus 504.

In the case of FEP routing node 600, it will be appreciated from FIG. 5 that the functionality of DACM card 508, as described above, is now provided by a DACM card 610 in combination with an external database access control (DAC) server 620. Once again, it will be appreciated the combination of DACM card 610 and DAC server 620 includes the database and control processes necessary to achieve the front end processing (FEP) functionality of the present invention. The DACM card 610 shown in FIG. 5 includes a signaling connection control part (SCCP) subsystem 520, a description of which was provided above. Also, as with the previously discussed embodiment, DACM card 610 includes an SCCP controller known as a signaling connection routing controller (SCRC) process 522. However, unlike the previous embodiment described above, DACM 610 employs a high-speed Ethernet controller (EC) process 612. Once again, as described above, the SCCP subsystem 520 is responsible for receiving and preliminary processing of incoming SCCP protocol message packets, while the SCRC process 522 is responsible for discrimination and subsequent distribution of signaling messages at the SCCP level. In the case of DACM card 610, messages that satisfy the SCRC discrimination criteria are distributed or directed to the high-speed Ethernet controller process 612. EC process 612 is in turn responsible for controlling the process of communicating messages, via an Ethernet connection 630, to and from the associated DAC server 620. More particularly, DAC server 618 includes a corresponding high-speed Ethernet controller process 622 that serves as the communications interface between DACM card 610 and an on-board DAC process 524. Once again, it will be appreciated that DAC process 524 generally includes a DAC database process 526 and a DAC protocol translation process 528, and is responsible for determining whether front end processing service is to be provided by the FEP routing node. DAC process 524 is also responsible for monitoring and storing information related to the operating status of provisioned network database or SCP nodes. As discussed previously, in addition to operating status type information, DAC process also contains information related to database or SCP node ownership. Consequently, message routing decisions can be based, at least in part, upon database or SCP node ownership. Along with such operating status and ownership information, the DAC database process 526 maintains a set of routing address translation instructions, which are generally illustrated in FIG. 4. It will be further appreciated that DAC protocol translation process 528 is provisioned to translate incoming database query and response messages into any of a variety of database query protocols (e.g., SQL, ODBC, etc.) depending upon the database protocol dictated by a particular destination SCP or database node. Once DAC processing is complete, the resulting message is passed to an HMRT process 532 for internal routing to the appropriate outbound LIM or DCM module.

Once again, it will be appreciated from FIG. 5 that DAC server 620 is in communication with and serviced by an operations administration and maintenance (OAM) system 528, in much the same manner as that described above for DACM 508 in FIG. 3.

In the embodiment shown in FIG. 5, the DAC process 524 resides in one or more blocks of high speed random access memory (RAM) that are located within the DAC server 620. However, it will be appreciated by those skilled in the art of high-performance computing systems that such a software process and any databases associated therewith could be configured such that some or all of the information is stored on a high density, fast access physical storage media such as magnetic or optical discs.

Once again, as indicated in FIG. 4, the DAC database component 526 of DAC server 620 is comprised of a series of entries or records, with each record containing a number of data fields including, but not limited to: a point code (PC) field, a subsystem (SSN) field, an IP host name field, an IP port field, a database or SCP node protocol field, a service or translation type (TT) field, a node status field, a node congestion field, and an owner field.

DAC Query Transaction Processing

Figure 6:
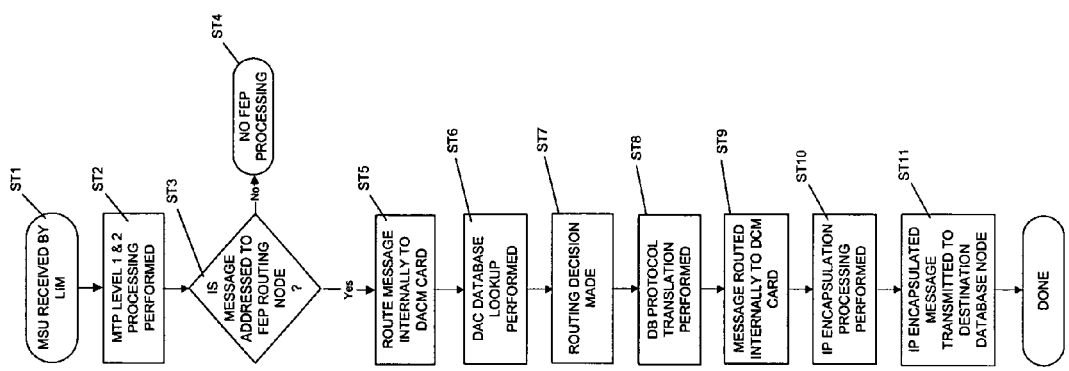
FIG. 6 is a flow chart diagram illustrating integrated front end processor (FEP) processing of a SCP query message according to an embodiment of a packet routing node of the present invention.

For purposes of illustration, the path of a typical SS7 TCAP query message requiring FEP routing node service is traced, in FIG. 3, from reception at the FEP routing node 500 by the inbound LIM 502, through processing by DACM card 508, and on to the outbound DCM 510. A detailed flow chart of FEP related query message processing steps is presented in FIG. 6, and may be used in conjunction with the schematic diagram shown in FIG. 3 to better understand FEP servicing methodology.

Beginning with step ST1, an incoming TCAP query message is received at the inbound LIM module 502. In step ST2, the incoming TCAP query message is received and processed by the MTP Level 1 and 2 process 512. With MTP Level 1 and 2 processing complete, the signaling message packet is temporarily buffered in the I/O queue 514 before being passed up the stack to the MTP Level 3 HMDC process 516, where SCCP type discrimination processing is performed. In the example shown in FIG. 2, HMDC process 516 examines the message packet and determines that the DPC of the packet is the PC (2-1-1) of the FEP routing node 500 (ST3). Consequently, further processing of the SCCP MSU within the FEP routing node is assumed to be necessary, and the packet is passed to the HMDT process 518.

In this particular example, it is assumed that the FEP routing node 500 is provisioned to respond to query messages that are addressed to the true or capability point code of the FEP routing node 500. However, as mentioned previously, FEP routing node 500 could easily be provisioned to provide FEP-type processing in response to many point codes other than that of the FEP routing node. While it may prove to be advantageous for service providers to implement an FEP routing node of the present invention in a communications network in a manner such that all query messages requiring FEP-type processing are addressed to the same PC as that of the FEP routing node, it is not essential to the operation of the present invention.

The HMDT process 518 examines the service indicator (SI) field of the incoming TCAP MSU, which indicates that the message is of an SCCP type. As such, HMDT process 518 places the incoming MSU on high speed IMT bus 504 for transport to DACM 508 and subsequent FEP servicing (ST5).

The internally routed TCAP MSU is received by the DACM resident SCCP process 520, and subsequently examined by SCRC process 522 that is resident on DACM card 508. Upon successful verification, the TCAP MSU is directed to DAC application 524 for further processing. DAC application processing begins with a general determination of incoming message type. Following the determination that the message is a TCAP-type query message, DAC process 524 proceeds with verification of the pointers and field lengths associated with the TCAP message. Given that the message is a TCAP-type query message, a lookup is performed in DAC database 526 based on PC and SSN information contained within the message (ST6). Referring again to FIG. 4, it will be appreciated that in the case of an incoming TCAP query message addressed to PC: 2-1-1 and SSN: 50, the DAC database lookup would return two matching records. DAC process 524 then examines both returned routing translation records and makes a final routing decision based on a pre-defined set of selection rules or conditions.

Once again, as indicated in FIG. 4, it will be appreciated that one of the two returned routing translation records contains a status field value which indicates that the SCP or database node with which it is associated is currently out of service (OOS). Clearly, routing the TCAP query message to an SCP or database node that is OOS would not be desirable. Thus, in this particular example, DAC process 524 opts to route the incoming TCAP query message to the SCP or database node with an IP address of 10.20.30.40: port 5230 (ST7). As such, routing label information within the message packet is modified to reflect this change of destination routing address. In step ST8, using information returned by the DAC database lookup that identifies the protocol employed by the database residing at IP address 10.20.30.40: port 5230, DAC process 524 next directs the TCAP query to the DAC protocol translation process 528. In this case, DAC protocol translation process 528 uses the database query information contained within the TCAP message to construct an equivalent SQL query statement. This new SQL query statement is then substituted for the original database query content of the incoming TCAP message.

With message routing address translation and query protocol translation processing complete, the modified query message is next passed to HMRT process 532 for internal routing to the appropriate DCM card (ST9). Consequently, the modified message packet is internally routed across the IMT bus 504 to DCM 510, where it is generally received by the I/O queue process 540. Eventually, the modified message packet is passed from the I/O queue process 540 on to the IP Level 2 and Level 1 process 542 where properly formatted IP routing label information is applied to the packet prior to transmission into the associated IP network 216 (ST10). Following successful IP Level 1 and 2 processing, the message packet is transmitted into the IP network 216 and generally towards the destination SCP or database node as identified by the previous FEP processing (ST11).

It will also be appreciated that the processing of an incoming TCAP query message is performed in a very similar manner for the embodiment of the FEP routing node 600 shown in FIG. 5. In the case of the configuration contemplated in FIG. 5, messages arriving at the DACM card 610 are simply passed to an external DAC server 620 via a high-speed Ethernet connection 630 prior to DAC database lookup and protocol translation processing. In all other respects, processing of an incoming TCAP query message similar to that described above, would be identical in the FEP routing node 600.

Although the example presented above relates specifically to the reception and subsequent processing of a TCAP query message bound for an SCP or database node, it will be appreciated by those skilled in the art, that the FEP processing node of the present invention can easily be provisioned to intercept and process subsequent response messages generated by such SCP or database nodes. Such response message processing could include database protocol translation, so as to translate the database response statement into a protocol that is usable by the network element that originated or initiated the query transaction.

DAC Network Management Message Processing

As discussed briefly above, one aspect of FEP processing includes routing address translation that is based, at least in part, on the congestion and overall operational status of potential destination SCP or database nodes. Consequently, the FEP routing node, and more specifically DAC process 524, must be capable of acquiring and maintaining accurate information related to the status of the SCP or database nodes that are provisioned to have FEP service provided by the FEP routing node.

Figure 7:
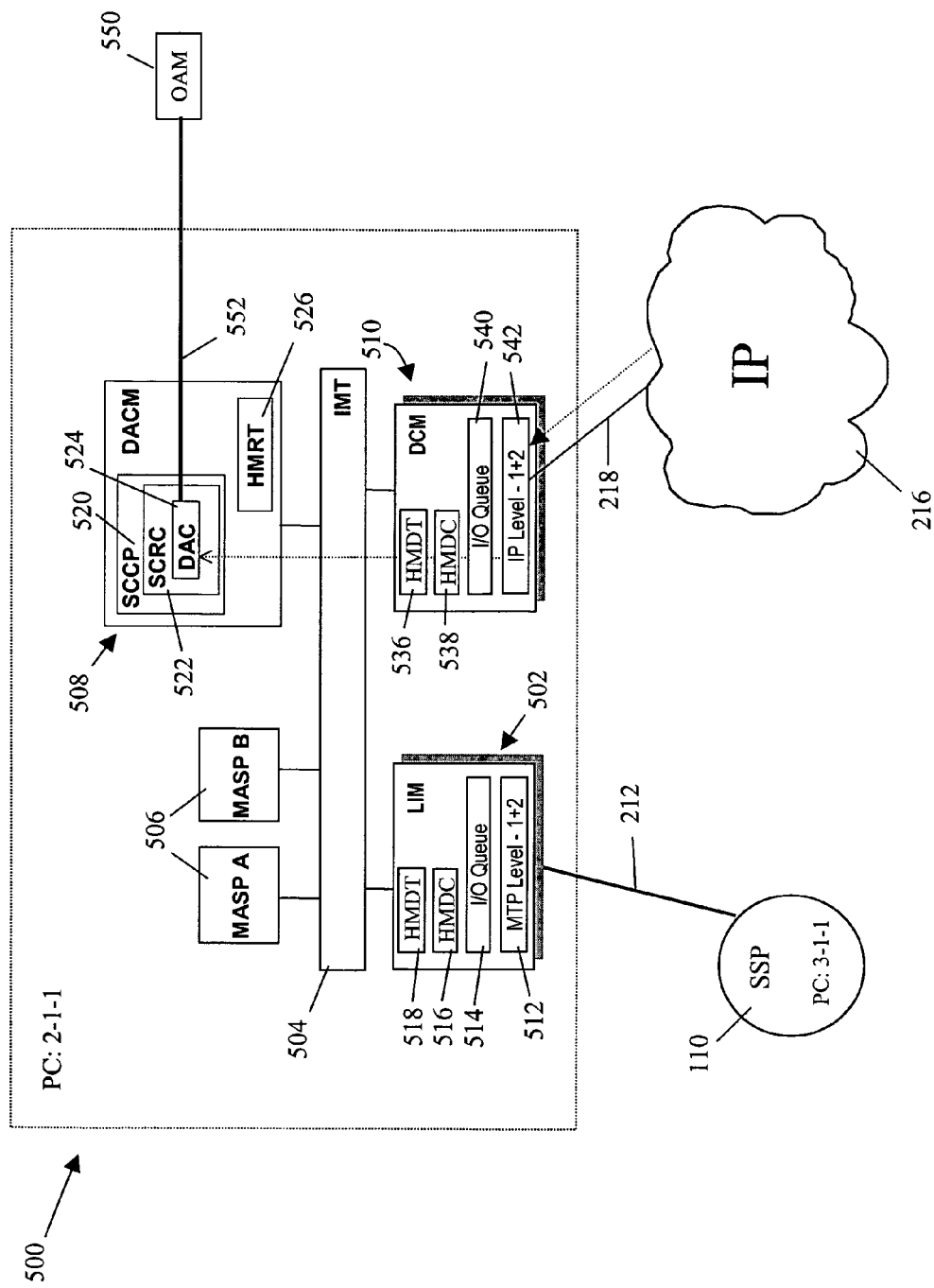
FIG. 7 is a schematic and message flow diagram of a system architecture according to a preferred embodiment of a packet routing node of the present invention, generally indicating message flow associated with an incoming network status packet.

Given such functional requirements, it will be appreciated that FIG. 7 generally illustrates the receipt and subsequent internal processing of a typical network management message received from an SCP or database node residing in or connected to IP network 216. More particularly, FEP routing node 500 is shown receiving a network management message associated with or sent by an SCP or database node that is provisioned to have FEP service provided by the FEP routing node 500. The network management message includes information related to the operational status of the related node or the communication pathway(s) that form the effective communication link between the related node and the FEP routing node 500. Examples of such status information might include, but are limited to; in service/out of service indicators, node congestion indicators, and link congestion indicators.

As indicated in FIG. 7, the network management message is received by DCM card 510 and subsequently TCP encapsulated and processed by the IP Level 1 & 2 process 542. With IP Level 1 and 2 processing complete, the message is passed to and temporarily buffered in I/O queue process 540 before being directed on to HMDC process 538. HMDC process 538 examines the incoming message packet and determines that the message contains information that is required by one or more DACM cards. Consequently, HMDC process 538 passes the message packet to HMDT process 536 for internal routing to the appropriate DACM card(s). In the example implementation shown in FIG. 7, HMDT process 536 internally routes the message packet via IMT bus 504 to the only provisioned DACM card in the system, DACM 508. It will be appreciated that if multiple DACM cards were simultaneously provisioned in the FEP routing node, HMDT process 536 could direct multiple copies of the network management message packet to each of the provisioned DACM cards connected to IMT bus 504.

Once the network management message packet is received by DACM card 508, the message is generally verified and processed by the SCCP and SCRC processes 520 and 522, respectively. The verified and processed network management message is then passed to the DAC process 524. DAC process 524 examines the message packet, extracts the necessary node status information, and updates the appropriate records in the DAC database 526.

Thus, by continuously monitoring and processing network management-type messages generated by the SCP and database nodes provisioned for FEP service by the FEP routing node of the present invention, routing translation data utilized by the FEP routing node to make routing decisions can be maintained in an accurate and useful state.

Once again, it will be appreciated that the FEP routing node configuration shown in FIG. 7 includes all DAC related processing modules onboard the DACM card 508. However, processing of network management messages would be similar in the case of FEP routing node 600, that is generally illustrated in FIG. 5. In the case of the configuration contemplated in FIG. 5, messages arriving at the DACM card 610 are simply passed to an external DAC server 620 via a high-speed Ethernet connection 630 prior to updating of the DAC database 526. In all other respects, processing of an incoming network management message similar to that described above, would be identical in the FEP routing node 500.

FEP Routing Node Network Implementations

Shown in FIGS. 8-11 are several examples of practical network implementations of an FEP routing node of the present invention. It will be appreciated that the particular embodiment of the FEP routing node chosen to illustrate these sample implementations is the same as that shown in FIG. 3 and described in detail above. However, other embodiments of the FEP routing node of the present invention could just as effectively be employed in these sample implementations, including the embodiment illustrated in FIG. 5.

Figure 8:
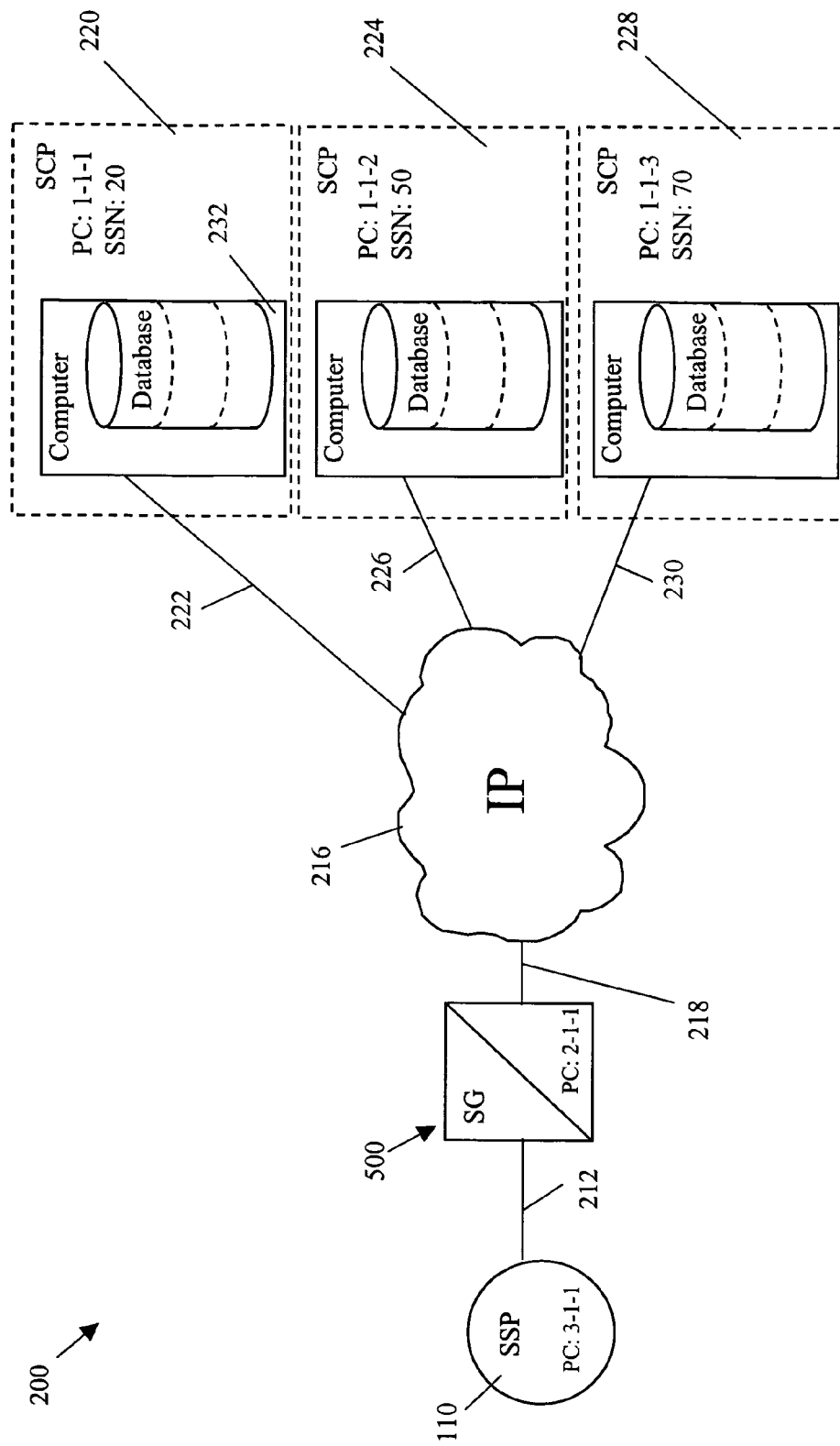
FIG. 8 is a network diagram illustrating an embodiment of the present invention that includes a packet routing node with FEP functionality and multiple SCP nodes.

Shown in FIG. 8 is a typical telecommunications network, generally indicated by the numeral 200. Telecommunications network 200 includes an end office or SSP 110, an FEP routing node 500, an IP data network 216, and three SCP nodes 220, 224, and 228. It will be appreciated that SSP 110 is communicatively coupled to FEP routing node 500 via an SS7 communication link 212. However, as mentioned previously, it is not essential that the link 212 be an SS7-type communication link. Such a link could be an IP link carrying encapsulated SS7 signaling messages. In any event, FEP routing node is in turn communicatively coupled to IP network 216 via an IP link or connection 218. Also connected to IP network 216 via IP connection 222 is SCP 220. In a similar manner, SCP 224 and SCP 228 are connected to IP network 216 via IP connections 226 and 230, respectively.

The network configuration shown in FIG. 8 is one of the more simple implementations of an FEP routing node of the present invention. When compared with the prior art network configuration illustrated in FIG. 1, it will be appreciated that the inclusion of FEP routing node 500 in FIG. 8 allows each of the provisioned SCPs 220, 224, and 228 to eliminate dedicated, internal FEP modules. Consequently, SCP 220 simply includes a computing platform 232 that serves a database back end processor. In a similar manner, SCP 224 and SCP 228 also include back end database computing platforms. Once again, it should be noted that each SCP 220, 224, and 228 is not required to implement a separate FEP module.

In the example shown in FIG. 8, all of the SCP nodes are identified by a unique SS7 point code, each of which is different from the point code assigned to the FEP routing node (2-1-1). More particularly, SCP 220 is assigned a point code of 1-1-1, while SCP 224 has a point code of 1-1-2, and SCP 228 has a point code of 1-1-3. It will also be appreciated that, as each of these SCP nodes is connected to the FEP routing node 500 via the IP data network 216, each SCP also has a uniquely assigned IP address in the form of a host name and port.

As such, when FEP routing node 500 receives a TCAP query message from SSP 110 that is destined for the SCP with point code of 1-1-1 and SSN of 20, FEP routing node might simply perform database protocol translation-type processing on the message, encapsulate the modified message in a properly addressed IP packet, and route the modified message on to SCP 220. Any other processing that was previously performed by FEP 128 shown in FIG. 1 could also be performed by the FEP routing node 500.

One of the great advantages of even such a simple implementation of a FEP routing node of the present invention is apparent upon closer examination of FIG. 8. This advantage being that a single Front End Processing module, properly integrated within a routing node of the present invention, can accommodate all of the FEP tasks associated with each of the SCPs 220, 224, and 228. Such an architecture presents SCP node owners with a major cost savings, which can ultimately be passed on to the end consumer.

Figure 9:
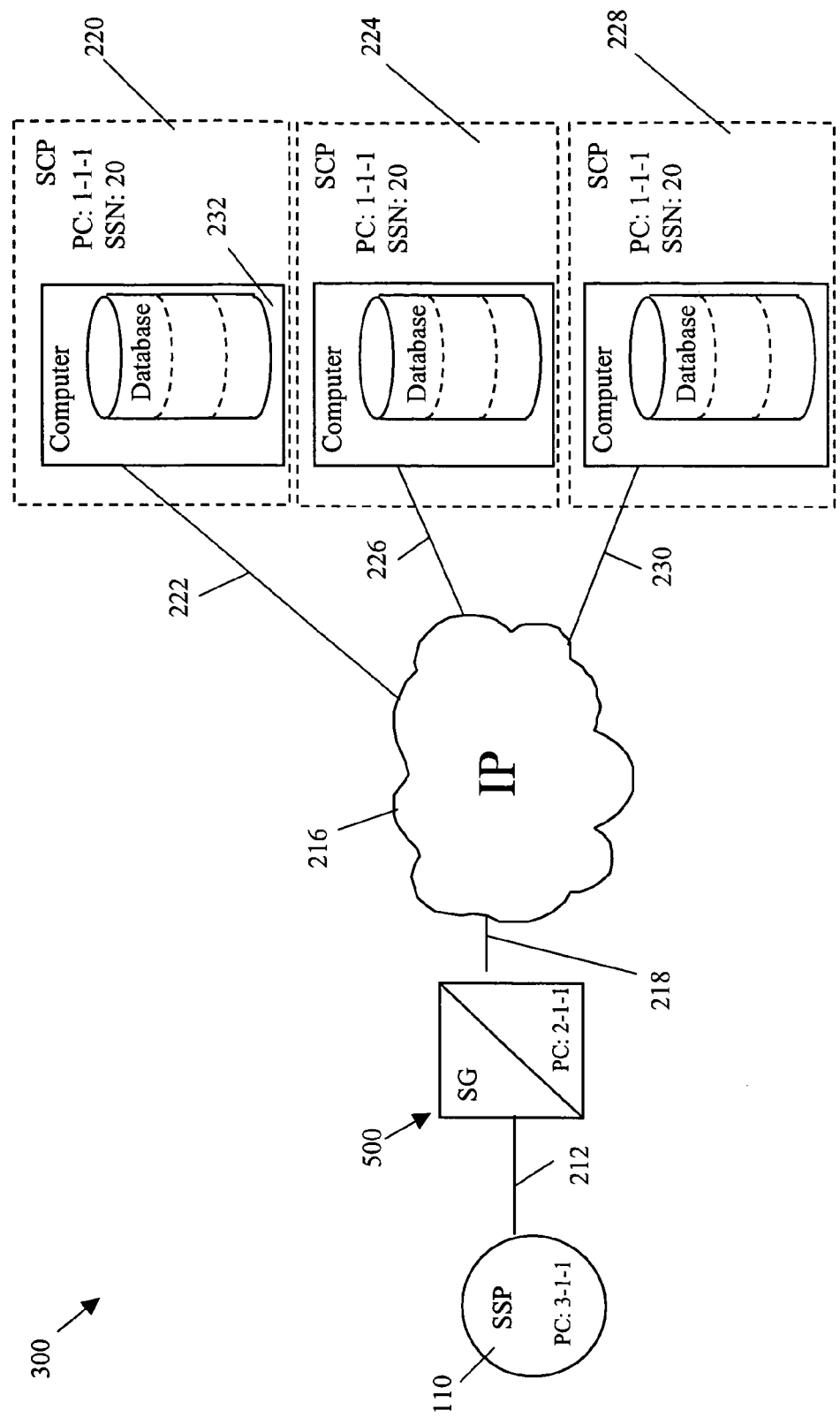
FIG. 9 is a network diagram illustrating another embodiment of the present invention where multiple SCP nodes each are assigned the same network address point code.

Illustrated in FIG. 9 is another typical telecommunications network, generally indicated by the numeral 300. As with the previously described telecommunications network 200, network 300 also includes an End Office or SSP 110, an FEP routing node 500, an IP data network 216, and three SCP nodes 220, 224, and 228. It will be appreciated that SSP 110 is communicatively coupled to FEP routing node 500 via an SS7 communication link 212. FEP routing node 500 is in turn communicatively coupled to IP network 216 via an IP link or connection 218. Also connected to IP network 216 via IP connections 222, 226 and 230 are SCPs 220, 224, and 228, respectively.

Figure 1:
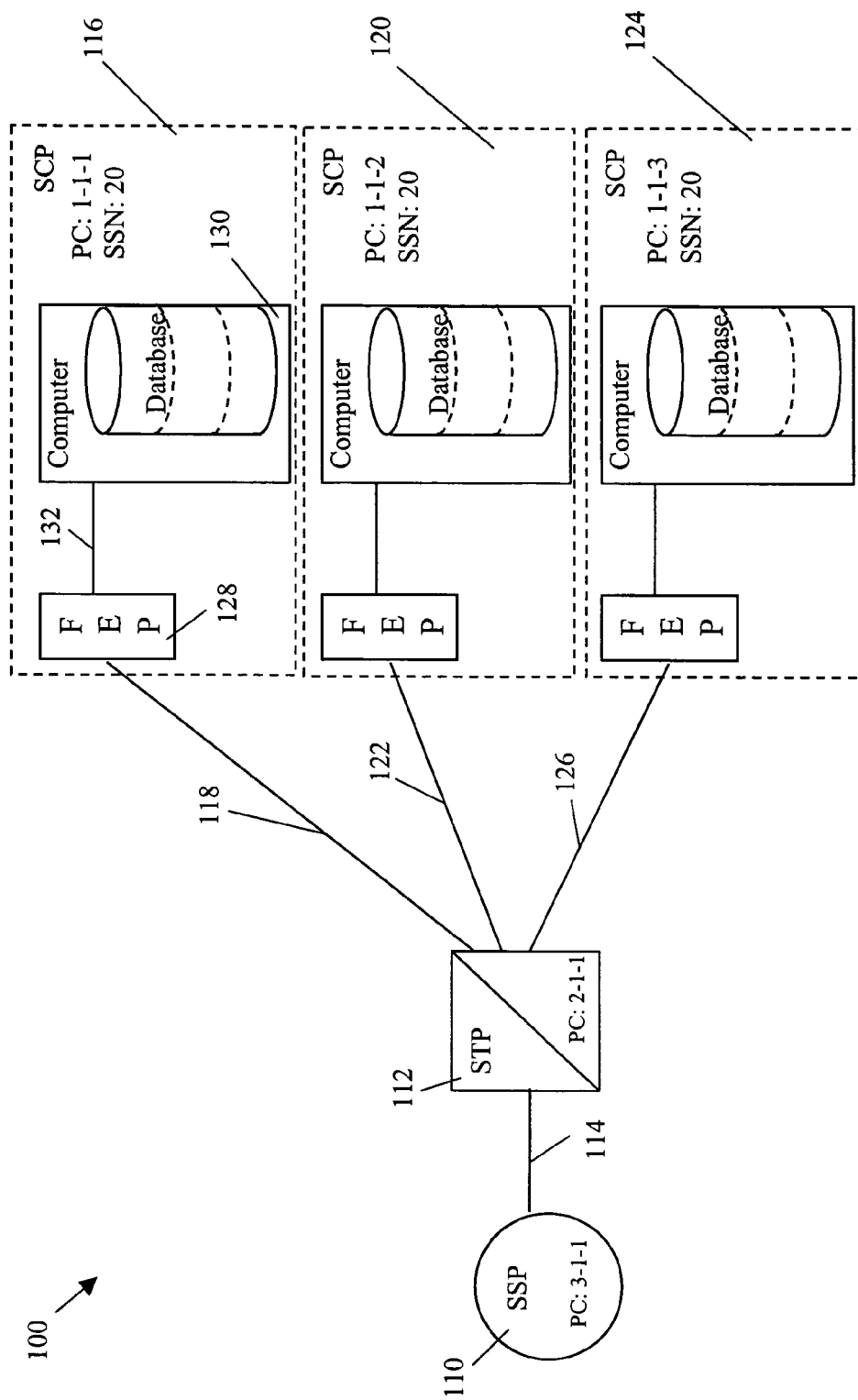
FIG. 1 is a network diagram illustrating a prior art telecommunications network that employs a signal transfer point (STP) node and multiple service control point (SCP) nodes.

Once again, when compared with the prior art network configuration illustrated in FIG. 1, it will be appreciated that the inclusion of FEP routing node 500 in FIG. 9 allows each of the provisioned SCPs 220, 224, and 228 to eliminate dedicated, internal FEP modules. Consequently, SCP 220 simply includes a computing platform 232 that serves a database back end processor. In a similar manner, SCP 224 and SCP 228 also include back end database computing platforms.

However, it will be appreciated that the network configuration shown in FIG. 9 is a slightly more complex implementation of an FEP routing node than that shown in FIG. 8. In the example shown in FIG. 9, all of the SCP nodes are identified by the same SS7 point code (1-1-1), which is different from the point code assigned to the FEP routing node (2-1-1) and all of the SCPs are provisioned with the same subsystem, SSN 20. However, as each of these SCP nodes is connected to the FEP routing node 500 via the IP data network 216, each individual SCP will still have a unique assigned IP address in the form of a Host name and Port.

As such, when FEP routing node 500 receives a TCAP query message from SSP 110 that is destined for the SCP with point code of 1-1-1 and SSN of 20, FEP routing node might make a decision to route based on the operational status or congestion status of the three SCPs 220, 224 and 228. Such load shedding or load sharing among the three similarly provisioned SCPs will ultimately lead to superior overall network performance. The FEP routing node 500 might further perform database protocol translation-type processing on the message, encapsulate the modified message in a properly addressed IP packet, and route the modified message on to the selected SCP. Once again, any additional processing that was previously performed by FEP 128 shown in FIG. 1 could also be performed by the FEP routing node 500.

Figure 10:
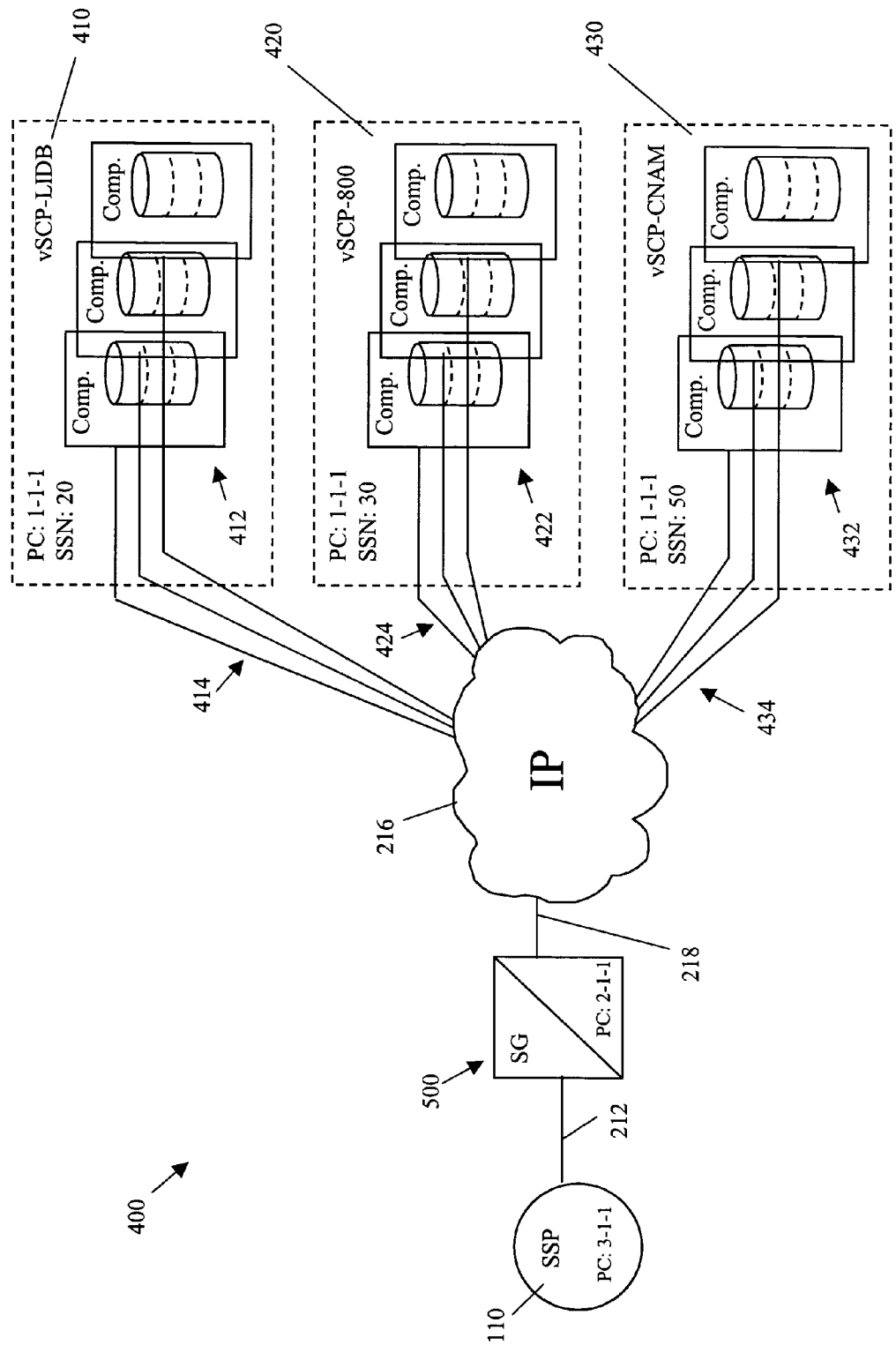
FIG. 10 is a network diagram illustrating another embodiment of the present invention where multiple virtual service control point (vSCP) nodes each are assigned the same network address point code.

Illustrated in FIG. 10 is yet another typical telecommunications network, generally indicated by the numeral 400. As with the previously described telecommunications network 200, network 400 also includes an end office or SSP 110, an FEP routing node 500, an IP data network 216, and three SCP nodes 410, 420, and 430. It will be appreciated that SSP 110 is communicatively coupled to FEP routing node 500 via an SS7 communication link 212. FEP routing node 500 is in turn communicatively coupled to IP network 216 via an IP link or connection 218. Also connected to IP network 216 via the plurality of IP connections 414, 424 and 434 are SCPs 410, 420, and 430, respectively. In this sample implementation, each SCP is comprised of multiple back end database processors which effectively form a series of virtual SCP (vSCP) nodes. More particularly, SCP 410 is comprised of a series of back end database processors generally indicated by the numeral 412, all of which are represented by a point code of 1-1-1 and subsystem of 20. In this example, it is assumed that SSN 20 of SCP 410 provides LIDB-type database information. SCP 420 is comprised of a series of back end database processors generally indicated by the numeral 422, all of which are represented by a point code of 1-1-1 and subsystem of 30. In this example, it is assumed that SSN 30 of SCP 420 provides 800 number-type database information. SCP 430 is comprised of a series of back end database processors generally indicated by the numeral 432, all of which are represented by a point code of 1-1-1 and subsystem of 50. In this example, it is assumed that SSN 50 of SCP 410 provides CNAM-type database information.

Once again, when compared with the prior art network configuration illustrated in FIG. 1, it will be appreciated that the inclusion of FEP routing node 500 in FIG. 10 allows each of the provisioned SCPs 410, 420, and 430 to eliminate dedicated, internal FEP modules that would have otherwise have been associated with each back end database processor.

It will be appreciated that the network configuration shown in FIG. 10 is a still slightly more complex implementation of an FEP routing node even than that shown in FIG. 9. In the example shown in FIG. 10, all of the SCP nodes are identified by the same SS7 point code (1-1-1), which is different from the point code assigned to the FEP routing node (2-1-1) yet each SCP node has a different subsystem provisioned for service. Once again, as each of the back end processors that comprise these SCP nodes is connected to the FEP routing node 500 via the IP data network 216, each individual back end processor of each SCP will still have a unique assigned IP address in the form of a host name and port.

As such, when FEP routing node 500 receives a TCAP query message from SSP 110 that is destined for the SCP with point code of 1-1-1 and SSN of 50, FEP routing node might make a decision to route based on the operational status or congestion status of the multiple back end processors 432 that are associated with SCP 430. Such load shedding or load sharing among multiple, similarly provisioned back end processors will ultimately lead to superior overall network performance. The FEP routing node 500 might further perform database protocol translation-type processing on the message, encapsulate the modified message in a properly addressed IP packet, and route the modified message on to the selected SCP back end processor. Once again, any additional processing that was previously performed by FEP 128 shown in FIG. 1 could also be performed by the FEP routing node 500.

Figure 11:
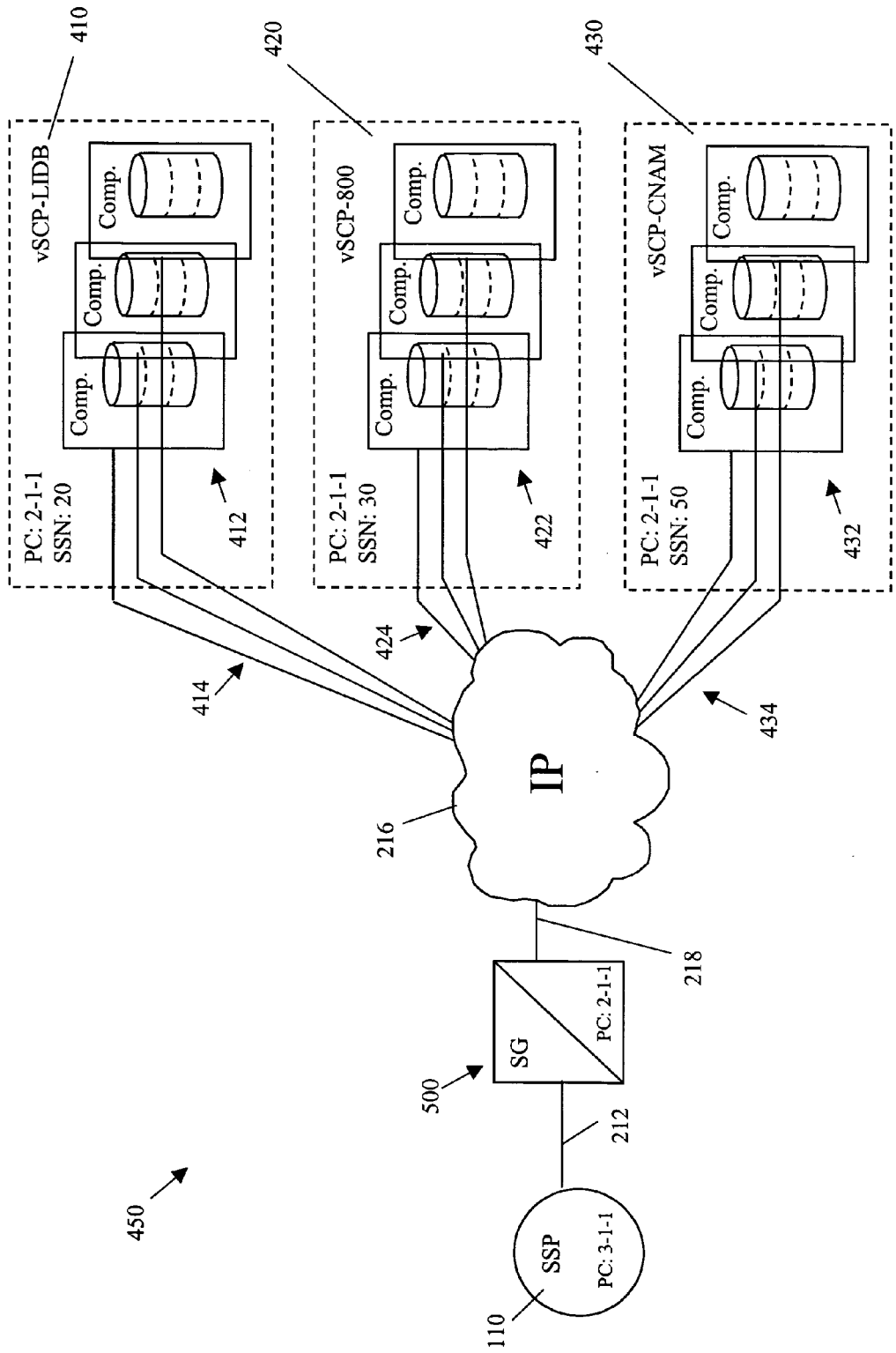
FIG. 11 is a network diagram illustrating another embodiment of the present invention where multiple vSCP nodes each are assigned the same network address point code as a packet router node.

Illustrated in FIG. 11 is still another typical telecommunications network, generally indicated by the numeral 450. As with the previously described telecommunications network 200, network 450 also includes an End Office or SSP 110, an FEP routing node 500, an IP data network 216, and three SCP nodes 410, 420, and 430. It will be appreciated that SSP 110 is communicatively coupled to FEP routing node 500 via an SS7 communication link 212. FEP routing node 500 is in turn communicatively coupled to IP network 216 via an IP link or connection 218. Also connected to IP network 216 via the plurality of IP connections 414, 424 and 434 are SCPs 410, 420, and 430, respectively. Once again, in this sample implementation, each SCP is comprised of multiple back end database processors which effectively form a series of virtual SCP (vSCP) nodes. More particularly, SCP 410 is comprised of a series of back end database processors generally indicated by the numeral 412, all of which are represented by a point code of 2-1-1 and subsystem of 20. In this example, it is assumed that SSN 20 of SCP 410 provides LIDB-type database information. SCP 420 is comprised of a series of back end database processors generally indicated by the numeral 422, all of which are represented by a point code of 2-1-1 and subsystem of 30. In this example, it is assumed that SSN 30 of SCP 420 provides 800 number-type database information. SCP 430 is comprised of a series of back end database processors generally indicated by the numeral 432, all of which are represented by a point code of 2-1-1 and subsystem of 50. In this example, it is assumed that SSN 50 of SCP 410 provides CNAM-type database information.

Once again, when compared with the prior art network configuration illustrated in FIG. 1, it will be appreciated that the inclusion of FEP routing node 500 in FIG. 10 allows each of the provisioned SCPs 410, 420, and 430 to eliminate dedicated, internal FEP modules that would have otherwise have been associated with each back end database processor.

It will be appreciated that the network configuration shown in FIG. 11 is perhaps the most powerful implementation of an FEP routing node of the present invention. It should be noted, as mentioned above, that in the example shown in FIG. 11, all of the SCP nodes are identified by the same SS7 point code (2-1-1), which is identically the same point code assigned to the FEP routing node (2-1-1) yet each SCP node has a different subsystem provisioned for service. Once again, as each of the back end processors that comprise these SCP nodes is connected to the FEP routing node 500 via the IP data network 216, each individual back end processor of each SCP will still have a unique assigned IP address in the form of a host name and a port. Those skilled in the art of telecommunications network operation will appreciate the implications and significance of such a network addressing scheme. From a practical standpoint, such a network architecture allows network operators to simply address all query messages to an FEP routing node, where the intelligence resides to determine which SCP or database should receive any given query message. Thus, as SCP or database nodes are added to the network, only routing information stored in the FEP routing node need be updated to reflect the network architecture change. In other words, the SCP or database portion of the communications network becomes essentially transparent to any service provider launching database queries. All the service providers need specify is the type of database service that is being requested (e.g., a subsystem or translation type), and the point code of the FEP routing node.

As such, when FEP routing node 500 receives a TCAP query message from SSP 110 that is destined for the SCP with point code of 2-1-1 and SSN of 50, FEP routing node might make a decision to route based on the operational status or congestion status of the multiple back end processors 432 that are associated with SCP 430. Such load shedding or load sharing among multiple, similarly provisioned back end processors will ultimately lead to superior overall network performance. The FEP routing node 500 might further perform database protocol translation-type processing on the message, encapsulate the modified message in a properly addressed IP packet, and route the modified message on to the selected SCP back end processor. Once again, any additional processing that was previously performed by FEP 128 shown in FIG. 1 could also be performed by the FEP routing node 500.

It will be understood that various details of the invention may be changed without departing from the scope of the invention. Furthermore, the foregoing description is for the purpose of illustration only, and not for the purpose of limitation--the invention being defined by the claims.

What is claimed is:

1. A network element for providing service control point (SCP) or database node front end processing (FEP) service and routing data packets through a communications network, the network element comprising:
   (a) a first communication module for transmitting data packets to and receiving data packets from a first communications network;
   (b) a second communication module for transmitting data packets to and receiving data packets from a second communications network;
   (c) a packet discrimination module for determining whether a data packet received from one of the first and second communications networks is intended for an SCP or database node that is provisioned to receive front end processing (FEP) service;
   (d) a database access control (DAC) database containing information related to SCP or database nodes that are provisioned to receive FEP service;
   (e) a DAC module for querying the DAC database and modifying the received packet to include information returned by the DAC database; and
   (f) a routing module for forwarding the modified packet to one of the SCP or database nodes.

2. The network element of claim 1 wherein the received data packet comprises a query message.

3. The network element of claim 1 wherein the DAC database is provisioned with information for providing FEP service for plural SCP or database nodes.

* * * * *